US011281689B1

(12) United States Patent
Gebremariam et al.

(10) Patent No.: US 11,281,689 B1
(45) Date of Patent: Mar. 22, 2022

(54) DISTRIBUTED INTERACTION FEATURE GENERATION SYSTEM

(71) Applicant: SAS Institute Inc., Cary, NC (US)

(72) Inventors: Biruk Gebremariam, Cary, NC (US); Taiping He, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/504,738

(22) Filed: Oct. 19, 2021

Related U.S. Application Data

(60) Provisional application No. 63/152,322, filed on Feb. 22, 2021, provisional application No. 63/137,021, filed on Jan. 13, 2021.

(51) Int. Cl.
 *G06F 16/00* (2019.01)
 *G06F 16/25* (2019.01)
 *G06F 17/18* (2006.01)
 *G06N 20/00* (2019.01)

(52) U.S. Cl.
 CPC ............ *G06F 16/258* (2019.01); *G06F 17/18* (2013.01); *G06N 20/00* (2019.01)

(58) Field of Classification Search
 CPC ...... G06F 16/258; G06F 17/18; G06F 16/254; G06N 20/00; G06H 10/60
 See application file for complete search history.

(56) References Cited

U.S. PATENT DOCUMENTS

| | | | | |
|---|---|---|---|---|
| 9,536,208 B1* | 1/2017 | Kakde | ..................... | G06N 20/00 |
| 9,639,809 B1* | 5/2017 | Kakde | ..................... | G06N 20/10 |
| 10,025,813 B1* | 7/2018 | Gebremariam | ........... | G06F 7/02 |
| 10,311,044 B2* | 6/2019 | Gebremariam | ..... | G06F 16/2365 |
| 10,628,409 B2 | 4/2020 | Gebremariam et al. | | |
| 10,824,694 B1* | 11/2020 | Gebremariam | ........ | G06N 20/00 |

(Continued)

OTHER PUBLICATIONS

Manish Pathak, tutorial "Feature Selection in R with the Boruta R Package," https://www.datacamp.com/community/tutorials/feature-selection-R-boruta, Mar. 7, 2018.

(Continued)

*Primary Examiner* — Noosha Arjomandi
(74) *Attorney, Agent, or Firm* — Bell & Manning, LLC

(57) ABSTRACT

A computing system creates interaction features from variable values in a transformed dataset that includes a variable value computed for each variable of transformed variables computed from a prior execution of a transformation flow applied to an input dataset. An interaction transformation flow definition indicates a subset of the transformed variables, a synthesis definition, and interaction transformation operations to apply to the transformed variables. The synthesis definition describes how the subset of the transformed variables are combined to compute a value input to the interaction transformation operations. A plurality of variable combinations of the subset is defined. A computation is defined for each combination and interaction transformation operation. An operation data value is computed for each computation from the transformed dataset. An observation vector is read from the transformed dataset and a current interaction variable value is synthesized for each combination. A result value is computed for each combination.

30 Claims, 18 Drawing Sheets

(56) References Cited

U.S. PATENT DOCUMENTS

| | | | | |
|---|---|---|---|---|
| 11,195,084 | B1* | 12/2021 | Wu | G06N 3/0454 |
| 2005/0234688 | A1* | 10/2005 | Pinto | G05B 17/02 |
| | | | | 703/6 |
| 2014/0279838 | A1* | 9/2014 | Tsirogiannis | G06F 16/22 |
| | | | | 707/603 |
| 2018/0300609 | A1* | 10/2018 | Krishnamurthy | G06N 3/0445 |
| 2020/0183769 | A1* | 6/2020 | Poghosyan | G06F 11/0709 |
| 2021/0287116 | A1* | 9/2021 | Chen | G06N 5/04 |
| 2021/0365842 | A1* | 11/2021 | Parker | G06N 20/10 |

OTHER PUBLICATIONS

Miron Bartosz Kursa, Package 'Boruta', Wrapper Algorithm for All Relevant Feature Selection, version 7.0.0, May 21, 2020, https://gitlab.com/mbq/Boruta/.

* cited by examiner

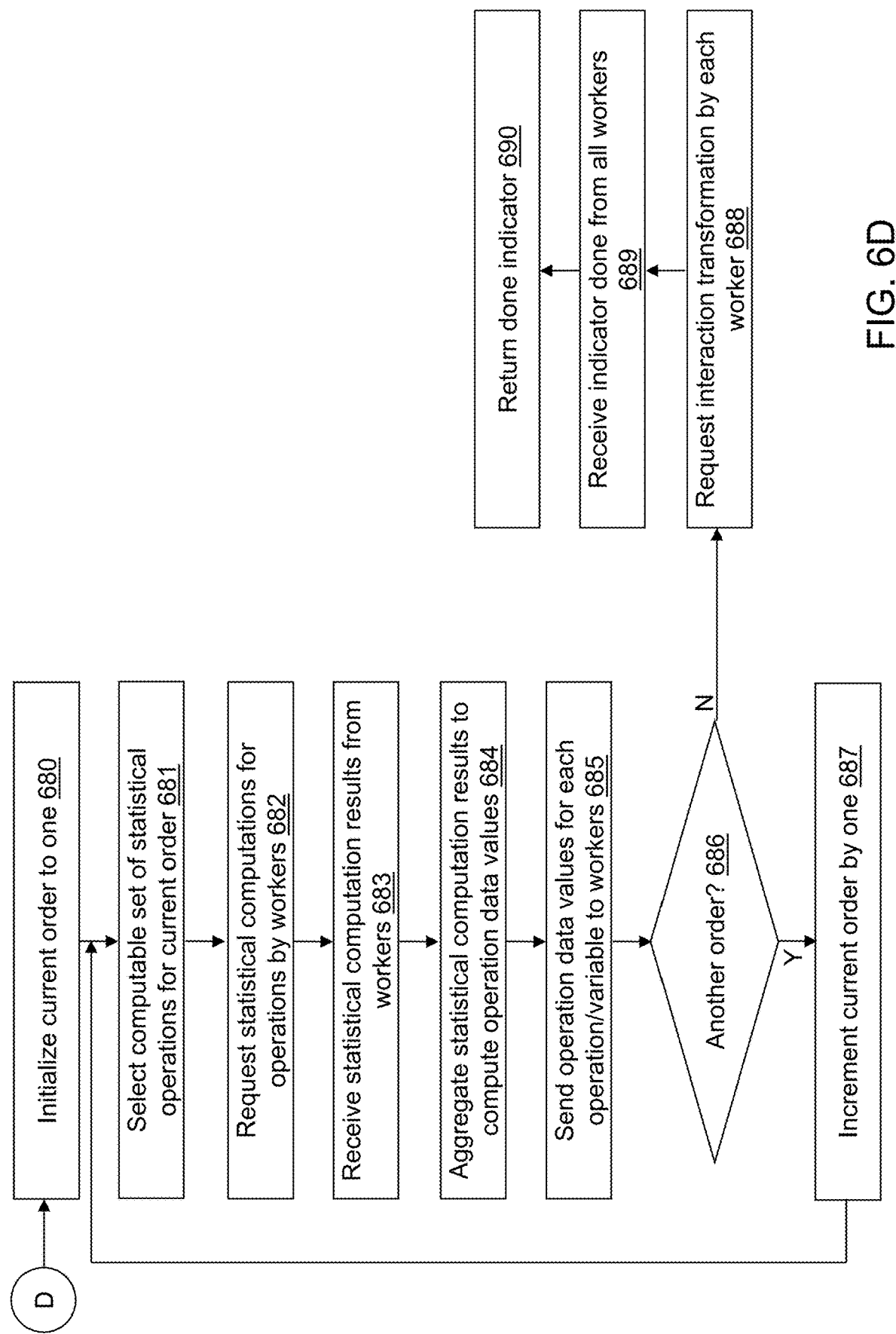

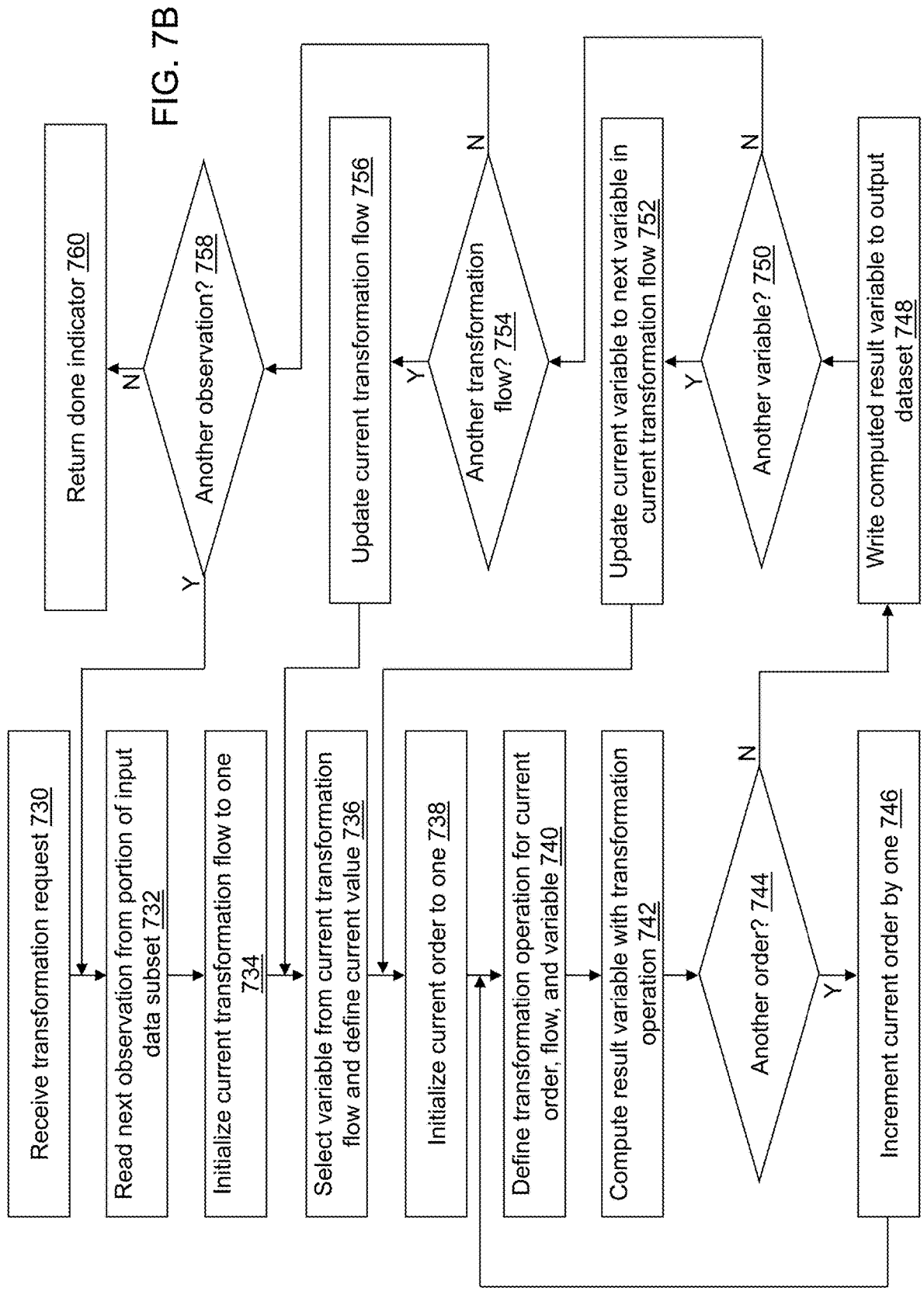

DISTRIBUTED INTERACTION FEATURE GENERATION SYSTEM

CROSS-REFERENCE TO RELATED APPLICATIONS

The present application claims the benefit of and priority under 35 U.S.C. § 119(e) to U.S. Provisional Patent Application No. 63/152,322 filed Feb. 22, 2021, the entire contents of which are hereby incorporated by reference. The present application also claims the benefit of and priority under 35 U.S.C. § 119(e) to U.S. Provisional Patent Application No. 63/137,021 filed Jan. 13, 2021, the entire contents of which are hereby incorporated by reference.

BACKGROUND

Interaction features account for a significant amount of the predictive performance difference between linear models (such as a generalized linear model) and tree-based ensemble models (such as random forests and gradient boosting machines). Predictive algorithms demonstrate this through their judicious incorporation of interaction features. Additionally, the ever increasing need to construct interpretable models implies that interaction features will continue to play an important role in creating predictive models that are both performant and interpretable.

However, the generation of interaction features is a time- and resource-consuming effort. In addition to the combinatorial explosion that results based on the number of variables, there is a need to efficiently explore a large number of preprocessing operators to prepare the inputs variables into a form that is amenable to the generation of interaction features. For example, for two interval variables x and y, if x is a highly skewed, high-missing variable, there may be a need to apply imputation and/or skewness-reducing transformations such as a Box-Cox transformations or discretization prior to its use in generating an interaction feature.

SUMMARY

In an example embodiment, a computer-readable medium is provided having stored thereon computer-readable instructions that when executed by a computing device, cause the computing device to create interaction features from variable values in a transformed dataset. A transformed dataset is created that includes a variable value computed for each variable of a plurality of transformed variables. The plurality of transformed variables are computed from a prior execution of a transformation flow applied to an input dataset. (A) An interaction transformation flow definition is received. The interaction transformation flow definition indicates a subset of the plurality of transformed variables, a synthesis definition, and one or more interaction transformation operations to apply to the plurality of transformed variables. The synthesis definition describes how the subset of the plurality of transformed variables are combined to compute a value input to the one or more interaction transformation operations. (B) A plurality of variable combinations of the subset of the plurality of transformed variables is defined based on the synthesis definition. (C) A computation is defined for each combination of the defined plurality of variable combinations and for each interaction transformation operation of the one or more interaction transformation operations. (D) An operation data value is computed for each defined computation from a plurality of observation vectors read from the transformed dataset. Each observation vector of the plurality of observation vectors includes a plurality of values. Each value of the plurality of values is associated with a different variable of the plurality of transformed variables. (E) An observation vector is read from the transformed dataset to define a variable value for each variable of the plurality of transformed variables. (F) A current interaction variable value is synthesized for each combination of the defined plurality of variable combinations using the defined variable value for each variable of the plurality of transformed variables included in a respective combination of the defined plurality of variable combinations. (G) A current interaction transformation operation is selected from the one or more interaction transformation operations. (H) The computed operation data value for the selected current interaction transformation operation is selected. (I) A transformation function is defined with the selected, computed operation data value based on the selected current interaction transformation operation. (J) A result value is computed for each combination of the defined plurality of variable combinations by executing the defined transformation function with the current interaction variable value defined for the respective combination of the defined plurality of variable combinations. (K) (H) to (J) are repeated with each remaining transformation operation of the one or more interaction transformation operations as the selected current interaction transformation operation and with the current interaction variable value equal to the computed result value for each combination of the defined plurality of variable combinations. (L) The computed result value is output to a second transformed dataset. (E) to (L) are repeated with each remaining observation vector stored in the transformed dataset.

In another example embodiment, a system is provided. The system includes, but is not limited to, a processor and a computer-readable medium operably coupled to the processor. The computer-readable medium has instructions stored thereon that, when executed by the processor, cause the system to create interaction features from variable values in a transformed dataset.

In yet another example embodiment, a method of creating interaction features from variable values in a transformed dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 6A through 6D depict a flow diagram illustrating examples of operations performed by the controller device of FIG. 3 in support of data transformation in accordance with an illustrative embodiment.

FIGS. 7A through 7C depict a flow diagram illustrating examples of operations performed by the worker device of FIG. 4 in support of data transformation in accordance with an illustrative embodiment.

DETAILED DESCRIPTION

Figure 1:
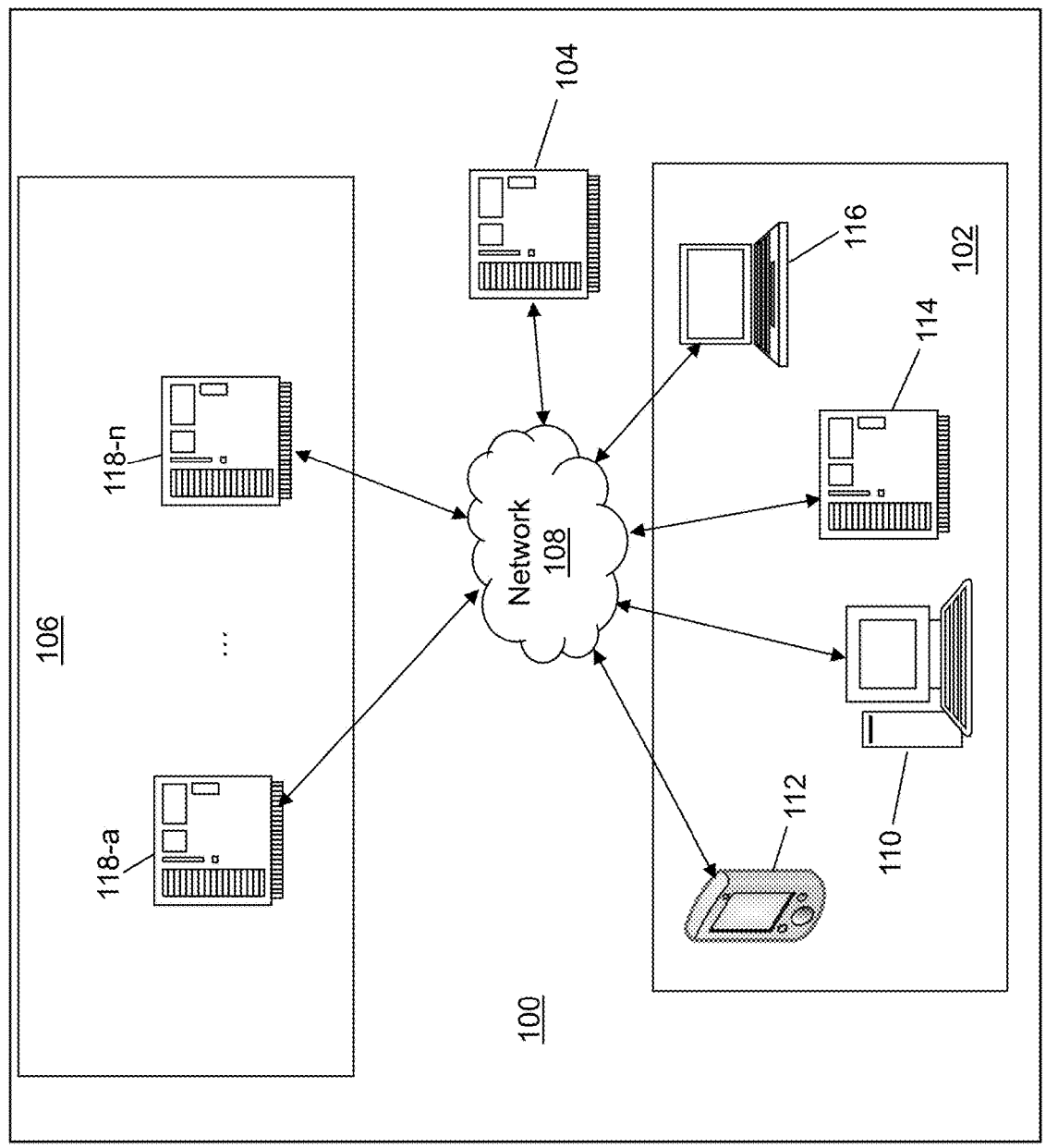
FIG. 1 depicts a block diagram of a data transformation system in accordance with an illustrative embodiment.

Referring to FIG. 1, a block diagram of a transformation system 100 is shown in accordance with an illustrative embodiment. In an illustrative embodiment, transformation system 100 may include a user system 102, a controller device 104, a worker system 106, and a network 108. Each of user system 102, controller device 104, and worker system 106 may be composed of one or more discrete computing devices in communication through network 108. User system 102 and controller device 104 may be integrated into a single computing device.

Transformation system 100 performs a plurality of variable transformation flows including interaction transformation flows simultaneously in a minimum of data passes with a minimum of calculations so that the user can explore multiple options for transforming one or more variables of the input dataset. Transformation system 100 also performs a single write to create the plurality of variable transformation flows including interaction transformation flows thereby avoiding the creation of intermediate datasets. The resulting transformed dataset that may include multiple data transformations of the same data can be input to a model training system to train one or more models that describe various characteristics of the transformed dataset. The trained model can be applied to new data to predict a characteristic of or to monitor the new data for identification of occurrence of an event.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from controller device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
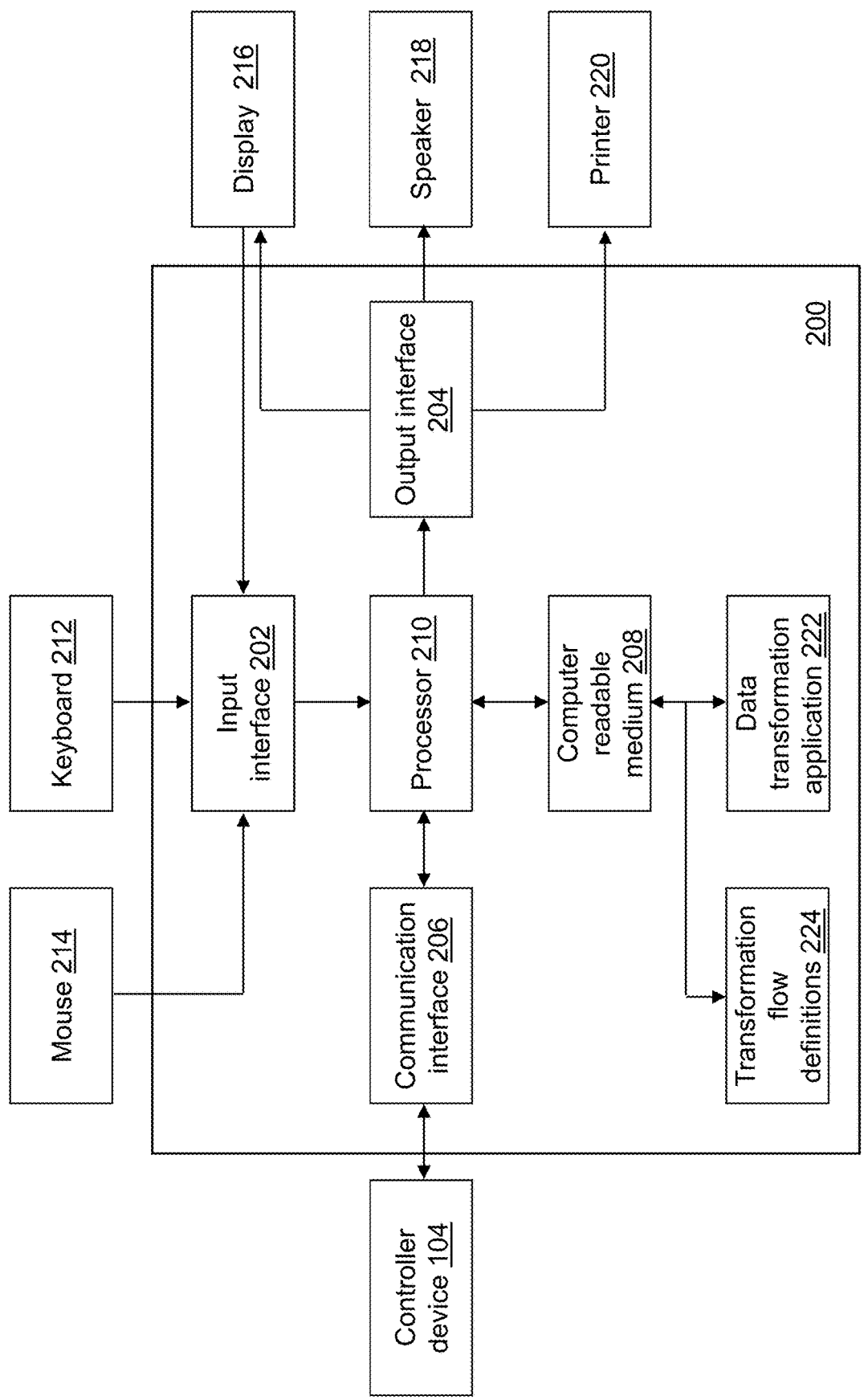
FIG. 2 depicts a block diagram of a user device of the data transformation system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, a data transformation application 222, and transformation flow definitions 224. Each computing device of user system 102 may be executing data transformation application 222 of the same or different type.

Referring again to FIG. 1, controller device 104 can include any form factor of computing device. For illustration, FIG. 1 represents controller device 104 as a server computer. Controller device 104 may send and receive signals through network 108 to/from user system 102 and/or to/from worker system 106. Controller device 104 may communicate using various transmission media that may be wired and/or wireless as understood by those skilled in the art. Controller device 104 may be implemented on a plurality of computing devices of the same or different type. Transformation system 100 further may include a plurality of controller devices that communicate with user system 102 and worker system 106.

Figure 3:
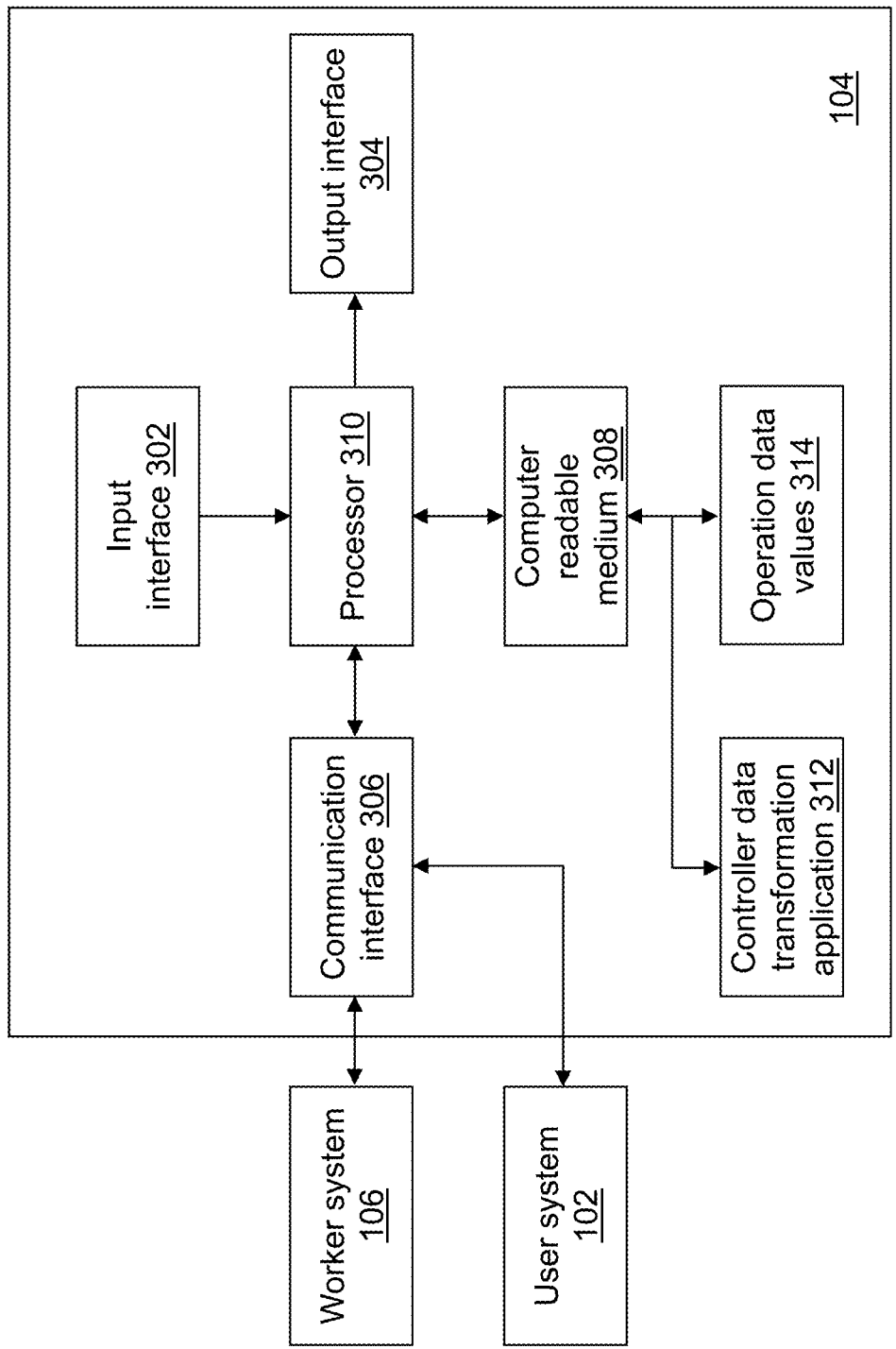
FIG. 3 depicts a block diagram of a controller device of the data transformation system of FIG. 1 in accordance with an illustrative embodiment.

For illustration, referring to FIG. 3, a block diagram of controller device 104 is shown in accordance with an illustrative embodiment. Controller device 104 may include a second input interface 302, a second output interface 304, a second communication interface 306, a second non-transitory computer-readable medium 308, a second processor 310, a controller data transformation application 312, and operation data values 314. Controller device 104 may execute controller data transformation application 312 that creates operation data values 314 based on the input dataset that may be distributed across the computing devices of worker system 106.

Referring again to FIG. 1, the one or more computing devices of worker system 106 may include computers of any form factor such as a desktop, a server, a laptop, etc. For example, in the illustrative embodiment, worker system 106 includes a first server computer 118-a, . . . , and an nth server computer 118-n. Each server computer may support use of a plurality of threads. The computing devices of worker system 106 may send and receive signals through network 108 to/from controller device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
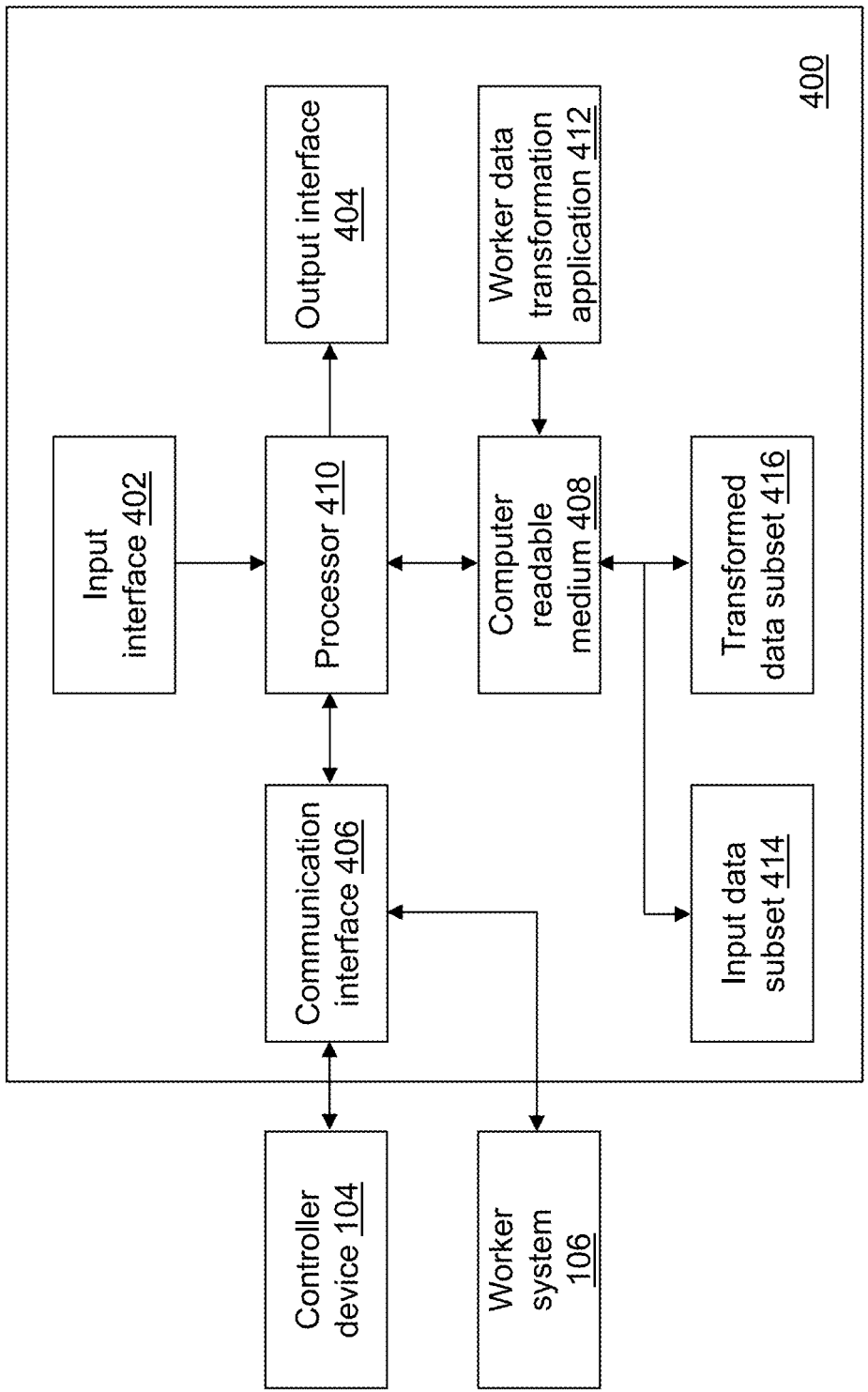
FIG. 4 depicts a block diagram of a worker device of the data transformation system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first server computer 118-a, . . . , and nth server computer 118-n may be an instance of worker device 400. Worker device 400 may include a third input interface 402, a third output interface 404, a third communication interface 406, a third non-transitory computer-readable medium 408, a third processor 410, a worker data transformation application 412, an input data subset 414, and a transformed data subset 416.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 may include a touch screen that accepts input from the user and that presents output to the user. User device 200 may have one or more input interfaces that use the same or a different input interface technology. The input interface technology further may be accessible by user device 200 through communication interface 206.

Output interface 204 provides an interface for outputting information for review by a user of user device 200. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and controller device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106 and/or output interface 204.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Data transformation application 222 performs operations associated with requesting transformation of the input dataset. The operations may be implemented using hardware, firmware, software, or any combination of these methods. Referring to the example embodiment of FIG. 2, data transformation application 222 is implemented in software (comprised of computer-readable and/or computer-executable instructions) stored in computer-readable medium 208 and accessible by processor 210 for execution of the instructions that embody the operations of data transformation application 222. Data transformation application 222 may be written using one or more programming languages, assembly languages, scripting languages, etc.

Data transformation application 222 may be implemented as a Web application. For example, data transformation application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Data transformation application 222 may be integrated with other analytic tools. As an example, data transformation application 222 may be part of an integrated data analytics software application and/or software architecture such as that offered by SAS Institute Inc. of Cary, N.C., USA. For example, data transformation application 222 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, data transformation application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, and SAS® Forecast Server, all of which are developed and provided by SAS Institute Inc. of Cary, N.C., USA. Data mining is applicable in a wide variety of industries.

Referring to FIG. 3, fewer, different, or additional components may be incorporated into controller device 104. Second input interface 302 provides the same or similar functionality as that described with reference to input interface 202 of user device 200 though referring to controller device 104. Second output interface 304 provides the same or similar functionality as that described with reference to output interface 204 of user device 200 though referring to controller device 104. Second communication interface 306 provides the same or similar functionality as that described with reference to communication interface 206 of user device 200 though referring to controller device 104. Data and messages may be transferred between controller device 104 and user device 200 and/or worker device 400 using second communication interface 306. Second computer-readable medium 308 provides the same or similar functionality as that described with reference to computer-readable medium 208 of user device 200 though referring to controller device 104. Second processor 310 provides the same or similar functionality as that described with reference to processor 210 of user device 200 though referring to controller device 104.

Controller data transformation application 312 performs operations associated with created transformed features from variables included in the input dataset based on inputs provided from user device 200 using the computing devices of worker system 106. The input dataset may be distributed across the computing devices of worker system 106. Though not shown, a subset of the input dataset may further may be stored on controller device 104. The operations may be implemented using hardware, firmware, software, or any combination of these methods. Referring to the example embodiment of FIG. 3, controller data transformation application 312 is implemented in software (comprised of computer-readable and/or computer-executable instructions) stored in second computer-readable medium 308 and accessible by second processor 310 for execution of the instructions that embody the operations of controller data transformation application 312. Controller data transformation application 312 may be written using one or more programming languages, assembly languages, scripting languages, etc. Controller data transformation application 312 may be implemented as a Web application.

Controller data transformation application 312 may be integrated with other analytic tools. As an example, controller data transformation application 312 may be part of an integrated data analytics software application and/or software architecture such as that offered by SAS Institute Inc. of Cary, N.C., USA. For example, controller data transformation application 312 may be part of SAS® Enterprise Miner™ developed and provided by SAS Institute Inc. of Cary, N.C., USA. Merely for further illustration, controller data transformation application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, and SAS® Forecast Server, all of which are developed and provided by SAS Institute Inc. of Cary, N.C., USA.

Referring to FIG. 4, fewer, different, and additional components may be incorporated into worker device 400. Each worker device 400 of worker system 106 may include the same or different components or combination of components.

Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between worker device 400 and another computing device of worker system 106 and/or controller device 104 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Worker data transformation application 412 computes the transformed features from input data subset 414 based on inputs from controller device 104 to define transformed data subset 416 that is returned, or otherwise made available, to controller device 104. Worker data transformation application 412 may be integrated with other analytic tools. As an example, worker data transformation application 412 may be part of an integrated data analytics software application and/or software architecture such as that offered by SAS Institute Inc. of Cary, N.C., USA. For example, worker data transformation application 412 may be part of SAS® Enterprise Miner™ developed and provided by SAS Institute Inc. of Cary, N.C., USA. Merely for further illustration, worker data transformation application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, and SAS®

Forecast Server, all of which are developed and provided by SAS Institute Inc. of Cary, N.C., USA.

Data transformation application 222, controller data transformation application 312, and worker data transformation application 412 may be the same or different applications that are integrated in various manners to perform data transformation of the input dataset distributed across worker system 106. Data transformation application 222, controller data transformation application 312, and worker data transformation application 412 process a transformation request composed of user specifiable and configurable transformation flows. The user can specify multiple, connected transformation operations per flow in a user configurable order. These transformation operations include imputation, outlier detection and treatment, functional transformation, and discretization operations for interval variable transformations, and imputation, map-interval, hashing, date-time methods, and nominal grouping operations for nominal variable transformations. Any one of these operations may be included or excluded in a particular transformation flow depending on a compatibility of an operator with the transformation flow, and the operations can be configured in a user-specifiable order. Details related to which operators are compatible with which transformation flows is discussed in U.S. Pat. No. 10,025,813 titled Distributed Data Transformation System. Data transformation application 222, controller data transformation application 312, and worker data transformation application 412 provide the capability to succinctly express most, if not all, feature transformations that practitioners apply in their predictive modeling workflow, thereby resulting in faster model development.

Data transformation application 222, controller data transformation application 312, and worker data transformation application 412 further provide the capability to define interaction transformation flows that accept the output of a plurality of transformation flows as an input. The plurality of transformation flows provided as the input can be synthesized in various manners and one or more connected transformation operations may be defined for each interaction transformation flow in a user configurable order.

The composition of the most effective feature transformation steps depends on the particular modelling task, and in particular, the chosen predictive model type. As a result, practitioners typically iteratively apply and evaluate feature transformation steps in their predictive modeling workflow. This makes feature transformation a combinatorial problem that requires the exploration of a large feature transformation space. The user of data transformation application 222, controller data transformation application 312, and worker data transformation application 412 can specify multiple feature transformation flows and multiple feature transformation flows that are processed in parallel sharing data passes, which results in a significant reduction in a number of data passes that may be required to transform data to a form consumable by different predictive model types. This is an important contribution as it lets users efficiently explore and evaluate a large number of transformation flows and interaction transformation flows. There is also no generation of temporary (intermediate) datasets, which is especially important in a big-data and/or cloud environment where the computer memory may not be available to support intermediate datasets without additional expense and/or time.

Data transformation application 222, controller data transformation application 312, and worker data transformation application 412 provide an effective solution for this combinatorial problem through their expressive, parallel, multi-flow feature transformation and interaction transformation flows or pipelines. Each feature transformation flow and interaction transformation flow is user specifiable and configurable, thereby avoiding undue restrictions in the exploration of the feature transformation space. In addition, their parallel and multi-flow capabilities let the user explore multiple feature transformation pipelines for each variable or group of variables in parallel and in the same data pass, without generating temporary datasets.

Each feature transformation flow and each interaction transformation flow is an independent task, and as such, a variable may be a member of multiple transformation flows in support of different predictive model types that have different feature transformation needs. As a result, the multi-flow capability reduces the number of data passes (reads and writes) that are needed to prepare data for multiple predictive model types, which saves computing cycles, memory accesses, network communications, etc. Again, this is especially important in a big-data and/or cloud environment.

Data transformation application 222, controller data transformation application 312, and worker data transformation application 412 optimize computations using transformation flow similarity and variable flow analysis to avoid redundant intermediate computations across transformation flows. The transformation similarity and variable flow analysis techniques analyze the specified transformation flows to determine and deactivate redundant intermediate computations. Redundant intermediate computations are grouped into sets and only a single representative from each set is designated as computable. The rest of the members of the set are designated as non-computable. The non-computable members share the result from their computable counterpart avoiding redundant computations.

The input dataset may include, for example, a plurality of rows and a plurality of columns. The plurality of rows may be referred to as observation vectors or records (observations), and the columns may be referred to as variables (features). The input dataset may be transposed. The plurality of variables may define multiple dimensions or features for each observation vector. An observation vector $x_i$ may include a value for each of the plurality of variables associated with the observation i. The input dataset may include a target variable $y_i$ associated with the observation i. One or more values may be missing from one or more observation vectors and is referred to herein as missing data or missing data values.

Each variable of the plurality of variables may describe a characteristic of a physical object. For example, if the input dataset includes data related to operation of a vehicle, the variables may include an oil pressure, a speed, a gear indicator, a gas tank level, a tire pressure for each tire, an engine temperature, a radiator level, etc. The input dataset may include data captured as a function of time for one or more physical objects. As another example, the input dataset may include data related to images, where each row includes the pixels that define a single image.

The data stored in the input dataset may be generated by and/or captured from a variety of sources including one or more sensors of the same or different type, one or more computing devices, etc. The data stored in the input dataset may be received directly or indirectly from the source and may or may not be preprocessed in some manner. For example, the data may be preprocessed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

The input dataset may be stored on computer-readable medium 208, on second computer-readable medium 308, and/or on third computer-readable medium 408 of each worker device 400. In an illustrative embodiment, the input dataset may be distributed and loaded on each third computer-readable medium 408 of worker system 106. Data stored in the input dataset may be sensor measurements or signal values captured by a sensor such as a camera, may be generated or captured in response to occurrence of an event or a transaction, generated by a device such as in response to an interaction by a user with the device, etc. The data stored in the input dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the input dataset may be captured at different time points periodically, intermittently, when an event occurs, etc. One or more columns of the input dataset may include a time and/or date value.

The input dataset may include data captured under normal operating conditions of a physical object. The input dataset may include data captured at a high data rate such as 200 or more observations per second for one or more physical objects. For example, data stored in the input dataset may be generated as part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things before being stored in the input dataset. For example, the IoT can include sensors in many different devices and types of devices, and high value analytics can be applied to identify hidden relationships and to drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the input dataset.

The input dataset may be stored using various structures as known to those skilled in the art including one or more files of a file system, a relational database, one or more tables of a system of tables, a structured query language database, etc. Controller device 104 may coordinate access to the input dataset that is distributed across worker system 106. For example, the input dataset may be stored in a cube distributed across worker system 106 that forms a grid of computers as understood by a person of skill in the art. As another example, the input dataset may be stored in a multi-node Hadoop® cluster. For instance, Apache™ Hadoop® is an open-source software framework for distributed computing supported by the Apache Software Foundation. As another example, the input dataset may be stored in worker system 106 that forms a cloud of computers and is accessed using cloud computing technologies, as understood by a person of skill in the art. The SAS® LASR™ Analytic Server may be used as an analytic platform to enable multiple users to concurrently access data stored in the input dataset. The SAS® Viya™ open, cloud-ready, in-memory architecture also may be used as an analytic platform to enable multiple users to concurrently access data stored in the input dataset. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
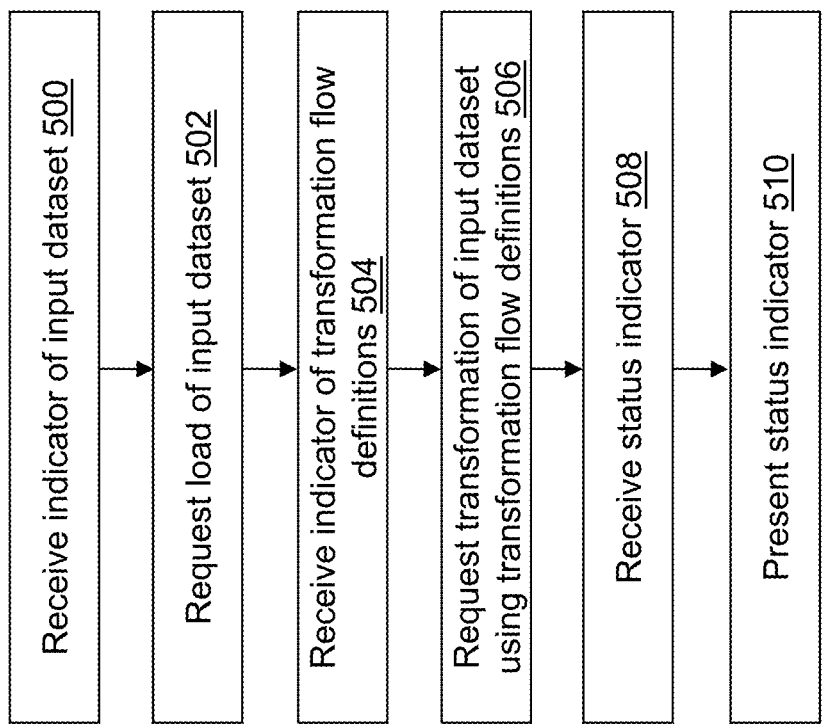
FIG. 5 depicts a flow diagram illustrating examples of operations performed by the user device of FIG. 2 in support of data transformation in accordance with an illustrative embodiment.

Referring to FIG. 5, example operations associated with data transformation application 222 are described. Additional, fewer, or different operations may be performed depending on the embodiment. The order of presentation of the operations of FIG. 5 is not intended to be limiting. A user can interact with one or more user interface windows presented to the user in a display under control of data transformation application 222 independently or through a browser application in an order selectable by the user. Although some of the operational flows are presented in sequence, the various operations may be performed in various repetitions, concurrently, and/or in other orders than those that are illustrated. For example, a user may execute data transformation application 222, which causes presentation of a first user interface window, which may include a plurality of menus and selectors such as drop down menus, buttons, text boxes, hyperlinks, etc. associated with data transformation application 222 as understood by a person of skill in the art. As further understood by a person of skill in the art, various operations may be performed in parallel, for example, using a plurality of threads.

A session may be established with controller device 104. A "session" includes user device 200, controller device 104 that is a controller node, and a plurality of worker devices of worker system 106. User device 200 accepts commands from a user and relays instructions to controller device 104. Controller device 104 establishes a communication network with the worker devices of worker system 106, sending instructions to the worker devices of worker system 106, collecting and aggregating the results of computations from the worker devices of worker system 106, and communicating final results to user device 200. Controller device 104 may utilize itself as a worker device. The worker devices of worker system 106 receive instructions from controller device 104, store and process data, and send the results of computations back to controller device 104. Worker devices of worker system 106 may also communicate with each other directly to accomplish a task. In an alternative embodiment, no worker computing devices may be used. Instead, controller device performs the described operations of each worker device 400 using one or more threads.

In an operation 500, a first indicator may be received that indicates the input dataset. For example, the first indicator indicates a location and/or a name of the input dataset. As an example, the first indicator may be received by data transformation application 222 after selection from a user interface window or after entry by a user into a user interface window. In an alternative embodiment, the input dataset may not be selectable. For example, a most recently created dataset may be used automatically.

In an operation 502, a load of the input dataset may be requested. For example, user device 200 may request that the input dataset be loaded into a table that is ready for processing by controller device 104 and/or each worker device 400 of worker system 106. In an alternative embodiment, the input dataset may already be ready for processing.

In an operation 504, a second indicator may be received that indicates a plurality of transformation flow definitions. The plurality of transformation flow definitions includes definitions for non-interaction and interaction transformation flows. The plurality of transformation flow definitions is used to define how each of a plurality of variables v are transformed though each variable can be transformed multiple times in different transformation flows. The plurality of transformation flow definitions is further used to define how each of a plurality of transformed variables $t_v$ are further combined and transformed using one or more interaction transformation flows. Each transformed variable can be transformed multiple times in different interaction transformation flows. Each transformed variable is generated by a previously executed transformation flow. Each transformation flow parameter value of the plurality of transformation flow definitions may have a predefined default value that may be used when a user does not specify a value for the transformation flow parameter using the second indicator.

In an operation 506, a request to transform the input dataset based on the plurality of transformation flow definitions is sent to controller device 104. For example, the user may select a button to indicate that the plurality of transformation flow definitions has been selected and that transformation of the input dataset should be performed. As another example, in the illustrative code below, the "run" statement triggers sending of the request to controller device 104. The plurality of transformation flow definitions may be sent in a message or other instruction to controller device 104, may be provided in a known memory location to controller device 104, etc. In an alternative embodiment, user device 200 and controller device 104 may be integrated in the same computing device so that when the plurality of transformation flow definitions is received by user device 200, it is also received by controller device 104.

Each transformation flow parameter value of each transformation flow definition may be received using a separate indicator. For example, the following first sample code establishes a session ("session mysess") and sends a transformation request ("dataPreprocess.transform") to process the input dataset defined by table="test".

```
proc cas;
   session mysess;
   dataPreprocess.transform/
   table="test"
   requestPackages={
   {
   name="pipeline1"
   inputs=${x1, x2}
   impute={method="mean"}
   outlier={method="IQR", treatment="trim"}
   function={method="log", args={otherArgs={10}}}
   discretize={method="bucket"}
   operationOrder="IFO"
   },
   {
   name="pipeline2"
   inputs=${x1}
   impute={method="mean"}
   function={method="standardize"}
   discretize={method="bucket"}
   },
   {
      name="pipeline3"
      inputs=${x1, x2, x3}
      targets=${y}
      outlier={method="IQR", treatment="trim"}
      discretize={method="MDLP"}
   },
   {
   name="pipeline4"
   inputs=${c1, c2}
   impute={method="mode"}
   catTrans={method="grouprare", args={nbins=3}}
   },
   {
   name="pipeline5"
   inputs=${c1}
   targets=${y}
   events={"1"}
   mapinterval={method="WOE"}
   },
   {
   name="int_pipeline1"
   interaction={synthesizer='nominal',
      inputs=${"pipeline1", "pipeline2", "pipeline3"},
      targets=${y}}
   catTrans={method="dtree", args={treeCrit='entropy',
      nbins=5}}
   },
   }
   casout={name="out1" replace=True}
   run;
quit;
```

Each request package of the "requestPackages" parameter is a transformation flow definition of one or more transformation flow definitions. Because each transformation flow can have multiple operations, computation of the parameters for an operation is based on the data that flows from the preceding operation, if any. For example, if an interval transformation has an impute operation followed by a functional transformation operation, the parameters of the functional transformation operation are estimated based on the imputed feature/variable.

In the illustrative code, five transformation flow definitions named "pipeline1", "pipeline2", "pipeline3", "pipeline4", and "pipeline5" and one interaction transformation flow definition named "int_pipeline" are defined by the "requestPackages" parameter. The user can define any number of transformation flow definitions and any number of interaction transformation flow definitions with each transformation flow definition associated with a distinct transformation flow that creates a new variable with results added as a new column to transformed data subset 416, which in the illustrative embodiment is named "out1".

Each transformation flow definition includes a "name" parameter that defines a name for the transformation flow and an "inputs" parameter that defines a list of one or more variables $v_{tf,i}$ to be transformed by the transformation flow indicated by tf, where i=1, . . . , $N_{tf}$, and $N_{tf}$ is a number of the one or more variables listed for the transformation flow indicated by tf. For example, for the first transformation flow definition named "pipeline1", $N_{tf}=2$, $v_{1,1}$ is a variable named "x1" read from the input dataset, and $v_{1,2}$ is a variable named "x2" read from the input dataset.

Each interaction transformation flow definition includes a "name" parameter that defines a name for the interaction transformation flow and an "inputs" parameter that defines a list of one or more transformation flow created variables $t_{itf,i}$ to be combined and transformed by the interaction transformation flow indicated by itf, where i=1, . . . , $N_{itf}$, and $N_{itf}$ is a number of the one or more created variables listed for the interaction transformation flow indicated by itf that are combined by the interaction transformation flow. For example, for the interaction transformation flow definition named "int_pipeline1", $N_{itf}=3$, $t_{1,1}$ is a variable created from execution of "pipeline1", $t_{1,2}$ is a variable created from execution of "pipeline2", and $t_{1,3}$ is a variable created from execution of "pipeline3". A plurality of variables may be created by each transformation flow that are each input to the interaction transformation flow. For example, each transformation flow creates $N_{tf}$ variables that are input to the interaction transformation flow for the transformation flow indicated by tf.

A transformation flow may include a "targets" parameter that defines a list of one or more target variables $vt_{tf,i}$ to be used by the transformation flow indicated by tf, where i=1, . . . , $N_{t,tf}$, and $N_{t,tf}$ is a number of the one or more target variables listed for the transformation flow indicated by tf. For example, for the third transformation flow definition named "pipeline3", $N_{t,tf}=1$, $vt_{3,1}$ is a variable named "y" read from the input dataset.

Similarly, an interaction transformation flow may include a "targets" parameter that defines a list of one or more target variables $vt_{itf,i}$ to be used by the interaction transformation flow indicated by itf, where i=1, . . . , $N_{t,itf}$, and $N_{t,itf}$ is a number of the one or more target variables listed for the interaction transformation flow indicated by itf. For example, for the interaction transformation flow definition named "int_pipeline1", $N_{t,itf}=1$, $vt_{1,1}$ is a variable named "y" read from the input dataset.

For a binary target variable, an "events" parameter defines a target variable that the user has selected for modelling, such as a rare level. For example, for fraud detection with target variable y, if a value of "1" indicates fraud, then a value for the "events" parameter may be "1".

Each transformation flow definition and each interaction transformation flow definition can be for either a nominal transformation flow type or an interval transformation flow type based on the type of variable(s) defined by the "inputs" parameter. Nominal transformation flow types are transformations for which the input variables are nominal variables. Each nominal transformation flow can include an impute operation ("impute"), a hash operation ("hash"), a map interval operation ("mapInterval"), a date/time method ("dateTime"), and/or a categorical grouping operation ("catTrans") that can be performed in the order they are defined in the transformation flow definition or the interaction transformation flow. For example, the fourth transformation flow definition named "pipeline4" is a nominal transformation flow that includes an impute operation followed by a categorical grouping operation.

The impute operation for a nominal transformation flow type imputes a value for the specified input variable(s) or created variable(s) when a value is missing for an observation using the specified method. Illustrative methods include a mean value method, a median value method, a mode value method, a random value method, etc., where the method is indicated by the user as part of the transformation flow definition. If no method is indicated, a default method, such as "mean", may be used. A mode statistic such as a mean value is computed for the specified input variable(s) or created variable(s) and may be referred to as an operation data value for the impute operation because it is computed prior to execution of the transformation operation or the interaction transformation operation.

The hash operation maps values for the specified input variable(s) or created variable(s) using the specified method. Illustrative methods include a murmur3 method, where the method is indicated by the user as part of the transformation flow definition. A number of bins may further be indicated by the user as part of the transformation flow definition. If no method or number of bins is indicated, a default method, such as "murmur3", and a default number of bins, such as 5, may be used.

The mapinterval operation maps values for the specified input variable(s) or created variable(s) to an interval scale using the specified method. Illustrative methods include a mean value method, a maximum value method, a minimum value method, a probability value method, a weight of evidence (WOE) method, etc., where the method is indicated by the user as part of the transformation flow definition. A number of intervals may further be indicated by the user as part of the transformation flow definition. If no method or number of intervals is indicated, a default method, such as "mean", and a default number of intervals such as 5 may be used. The mapped values, essentially interval-scaled intermediate variables, can be further processed using an interval transformation. Level-value maps are the operation data values defined for the mapinterval operation. Each level of the nominal variable is mapped to some interval/numeric value defined by the level-value maps.

The catTrans operation groups the specified input variable(s) or created variable(s) using the specified method. Illustrative methods include a label method, a rare method, a decision tree (dtree) method, a regression tree (rtree) method, etc., where the method is indicated by the user as part of the transformation flow definition. A number of bins may further be indicated by the user as part of the transformation flow definition. If no method or number of bins is indicated, a default method, such as "dtree", and a default number of bins, such as 5, may be used. The methods for determining the level-group maps operation data values include unsupervised such as the rare method and supervised methods, such as the decision tree method, the regression tree method, etc. Supervised methods use a target variable specified by the "targets" parameter to perform the grouping. The "args" parameter defined for the catTrans operation varies dependent on the method selected. For example, the rare level grouping method uses a number of bins into which the data is grouped. Level-group maps are the operation values defined for the categorical grouping operation.

The dateTime operation provides date-time feature construction operators applied to datetime variables such as a day of the week, a month of the year, a minute or an hour of the day, a quarter of the year, a leap year or not, etc.

Interval transformation flow types are transformations for which the input variables are interval variables. Each interval transformation flow type can include an impute operation ("impute"), an outlier operation ("outlier"), a functional transform operation ("function"), and/or a discretize operation ("discretize") that can be performed in the order they are defined in the transformation flow definition. For example, the first transformation flow definition named "pipeline1" is an interval transformation flow type that includes an impute operation followed by an outlier operation followed by a functional transform operation followed by a discretize operation.

Similar to the impute operation for a nominal variable, the impute operation for an interval variable imputes a value for the specified input variable(s) or created variable(s) when a value is missing for an observation using the specified method. Illustrative methods include a mean value method, a median value method, a winsorized mean value method, a trimmed mean method, etc., where the method is indicated by the user as part of the transformation flow definition. If no method is indicated, a default method, such as "mean", may be used.

The outlier operation detects, using the specified method, and treats, using the specified treatment method, outlier values for the specified input variable(s) or created variable(s). Illustrative methods for computing a lower threshold and an upper threshold include a z-score method, a robust z-score method, an inter-quantile range (IQR) method, a percentile method, a user-defined limits method, etc. Illustrative treatment methods for computing a replacement value include a winsorization method, a trimming and value replacement method, etc. The outlier operation depends on location and scale estimates. Location estimates may be computed as a mean, a median, a winsorized mean, a trimmed mean, a mid-range, a geometric mean, a harmonic mean, Tukey's biweight, etc. Scale estimates may be computed as a standard deviation, an IQR, a median absolute deviation about the median (MAD), a Gini scale, a Tukey's biweight, etc. The statistics are used to compute the operation data values for the outlier operation depending on the selected outlier detection and treatment methods. A lower threshold, an upper threshold, and a replacement value are the operation data values defined for the outlier operation.

The function operation transforms the specified input variable(s) or created variable(s) using the specified method. Illustrative methods include a log method, a square root method, a centering method, a standardization method, etc. The "args" parameter defined for the function operation varies dependent on the method selected. Depending on the method selected the function operation may not need computation of any operation data values. For example, the methods "log" and "sqrt" do not require any computation to perform the requested transformation. Data dependent methods such as centering and standardization include location and scale estimates as operation data values for the function operation. Location estimates may be computed as a mean, a median, a winsorized mean, a trimmed mean, a mid-range, a geometric mean, a harmonic mean, Tukey's biweight, etc. Scale estimates may be computed as a standard deviation, an IQR, a MAD, a Gini scale, a Tukey's biweight, etc. A location estimate value and a scale estimate value are operation data values that may be defined for the function operation.

The discretize operation transforms the specified input variable(s) or created variable(s) using the specified method. Cut-points (bin boundaries) are the operation data values defined for the discretize operation. Computation of the cut-points depends on the specified discretization method. The discretization methods include non-iterative (unsupervised) and iterative (supervised) techniques. Non-iterative (unsupervised) methods such as bucket and equal-frequency compute the cut-points based on statistics such as a minimum and a maximum or quantiles, and the specified number of bins. In contrast, iterative (supervised) techniques such as a minimum description length principle (MDLP), extended-chi-merge, class-attribute contingency coefficient (CACC), etc. use statistics for construction of a contingency (frequency) table, and the contingency table is processed by the specified method to estimate the cut-points. The minimum description length principle and the extended-chi-merge technique is described in J. Dougherty et al., *Supervised and Unsupervised Discretization of Continuous Features*, Proceedings 12th International Conference on Machine Learning, at 194 (1995). The class-attribute contingency coefficient technique is described in Cheng-Jung Tsai, Chien-I Lee, Wei-Pang Yang: A discretization algorithm based on *Class-Attribute Contingency Coefficient*. Inf. Sci. 178(3): 714-731 (2008).

As stated previously, transformation flows/pipelines are of either interval or nominal type. By default, if used, interval transformation operations may be processed according to the following sequence: 1) impute operation, 2) outlier operation, 3) function operation, and 4) discretize operation. By default, if used, nominal transformation operations may be processed according to the following sequence: 1) impute operation, 2) hash operation, and 3) catTrans operation or 4) mapinterval operation. For interval transformation operations, the default operation order can be changed using the "operationOrder" parameter. For example, setting the "operationOrder" parameter value to "FOI" indicates the following sequence: 1) function ("F") operation, 2) outlier ("O") operation, 3) impute ("I") operation, and 4) discretize operation. The "operationOrder" parameter value does not affect the discretize operation, which is applied last. Thus, the operation order for application of the function ("F") operation, the outlier ("O") operation, and the impute ("I") operation can be changed from the default order using the "operationOrder" parameter value and defining the order using the appropriate letter designation.

For illustration, Table I below includes the plurality of transformation flow definitions that can be selected by a user to define a transformation flow.

TABLE I

| Parameter name | Options | Default values |
| --- | --- | --- |
| name | name value | none |
| inputs | list of one more variable names including interaction variable names | none |
| impute | method - for interval transformation, mean, median, min, max, harmonic mean, winsorized mean, trimmed mean, geometric mean, user-provided value; for nominal, mode and user-provided value. | Mean for interval variable and mode for nominal variable |
| outlier | method - IQR, Z-score, modified Z-score, percentile, and user defined limits. treatment - trim, winsor, replace | IQR trim |
| function | method - log, BoxCox, exp, sqrt, power, standardize, center, . . . Options for location and scale estimates | standardize |
| discretize | method - bucket, quantile, MDLP, CACC, Chimerge, regressionTree (single predictor), WOE. Options to control the number of bins (nbins, max nbins, min nbins). | bucket |
| operationOrder | IOF, IFO, OIF, OFI, FIO, FOI | IOF |
| targets | list of one more target variable names | none |
| catTrans | method - grouprare, WOE, decisionTree. Options to control the number of bins (nbins, max nbins, min nbins). | grouprare |
| events | list of one or more events for the binary target variables. | none |
| mapinterval | Method - WOE, event-probability, standardized moments, counts | none |

In the illustrative code above, the first, second, and third transformation flows are interval transformation flows, while the fourth and fifth transformation flows are nominal transformation flows. In the illustrative code above, the interaction transformation flow is a nominal transformation flow. A complexity of a transformation flow is expressed by an order value that counts a number of operations in the transformation flow, where the order of a transformation flow is a number of operations of the transformation flow.

In the illustrative code above, the first transformation flow is a 4th-order transformation flow (impute operation, outlier operation, functional transform operation, discretize operation), the second transformation flow is a 3rd-order transformation flow (impute operation, functional transform operation, discretize operation), the third transformation flow is a 2nd-order transformation flow (outlier operation, discretize operation), the fourth transformation flow is a 2nd-order transformation flow (impute operation, catTrans operation), the fifth transformation flow is a 1st-order transformation flow (mapinterval operation), and the interaction transformation flow is a 1st-order transformation flow (catTrans operation). The order is computed based on the number of operations selected for each transformation flow.

As mentioned above, various statistical values may need to be computed as part of execution of an operation and are referred to as operation data values. Table II lists the operation data values that are computed in order to compute the transformed values for each type of operation. The hash operation does not include any operation data values.

TABLE II

| Statistic type | impute | outlier | function | discretize | map-Interval | catTrans |
|---|---|---|---|---|---|---|
| Basic | Yes | Yes | Yes | Yes | Yes | Yes |
| Location estimate | Yes | Yes | Yes | | | |
| Scale estimate | Yes | Yes | Yes | | | |
| Quantile | Yes | Yes | Yes | Yes | | |
| Contingency table | | | | Yes | Yes | Yes |
| Distinct counts | | | | Yes | Yes | Yes |
| WOE, moments, event probability, level frequency | | | | | | Yes |

Basic statistics include a number of observations, a minimum value, a maximum value, etc. Location estimates may include a mean value, a median value, a winsorized mean value, a trimmed mean value, a mid-range value, a geometric mean value, a harmonic mean value, a Tukey's biweight value, etc. Scale estimates may include a standard deviation, an IQR value, a MAD value, a Gini scale value, a Tukey's biweight value, etc. The operation data values that are computed depend on the type of operation selected as well as the selections associated with the type of operations such as the any method selected.

Interaction transformation flows further include a synthesize operation that indicates how the variables transformed by a transformation flow are combined to create new variable values that may be further operated on by the operations specified in the interaction transformation flow definition. The transformed variables are the outputs from a non-interaction transformation flow that may be an identity transformation flow definition. The synthesize operation is a first operation applied in the interaction transformation flow.

The synthesize operation creates groups of variables to combine and determines a number of output variables that are generated by the interaction transformation flow. For illustration, variables from four input transformation flows may include $v_{1,i}$, $i=1, \ldots, n$ from a first transformation flow, $v_{2,i}$, $i=1, \ldots, m$ from a second transformation flow, $v_{3,i}$, $i=1, \ldots, p$ from a third transformation flow, and $v_{4,i}$, $i=1, \ldots, q$ from a fourth transformation flow. Each of $v_{1,i}$, $v_{2,j}$, $v_{3,k}$, $v_{4,l}$, $i=1, \ldots, n$, $j=1, \ldots, m$, $k=1, \ldots, p$, $l=1, \ldots, q$ are variables created from execution of a non-interaction transformation flow. For illustration, the four transformation flows can generate a different number of outputs based on different numbers of input variables that are represented here by $N_{tf1}=n$, $N_{tf2}=m$, $N_{tf3}=p$, and $N_{tf4}=q$. The synthesize operation creates tuples out of the variables generated by the variables input from the non-interaction transformation flows. For the synthesize operation, the user can select between two modes of operation, cross and ordered using the interaction transformation flow definition. The interaction transformation flow definition may include a tuple indicator that indicates "cross" or "ordered". A default tuple indicator may be "ordered" when no tuple indicator is included in the interaction transformation flow definition.

The cross mode creates tuples by forming Cartesian products of the variables input from the different transformation flows. For example, given the four transformation flows that created $N_{tf1}=n$, $N_{tf2}=m$, $N_{tf3}=p$, and $N_{tf4}=q$ transformed variables, the combinations of input variables include $(v_{1,i}, v_{2,j}, v_{3,k}, v_{4,l})$, $i=1, \ldots, n$, $j=1, \ldots, m$, $k=1, \ldots, p$, $l=1, \ldots, q$, which results in $N_{itf}=n*m*p*q$ combinations of input transformed variables created from the variables defined by the four transformation flows, where $N_{itf}$ is a number of the one or more created variables listed for the interaction transformation flow indicated by itf that are combined by the interaction transformation flow.

The ordered mode creates tuples by forming position-ordered groups. For example, given the four transformation flows, $r=\max(n*m*p*q)$ is determined. The combinations of input variables include $(v_{1,i}, v_{2,i}, v_{3,i}, v_{4,i})$, $i=1, \ldots, r$, which results in $N_{itf}=r$ combinations of input transformed variables created from the variables defined by the four transformation flows, where the last variable is reused to reach r variables for each input transformation flow. For example, for the first transformation flow, $n_{excess}=r-n$ so $v_{1,i}$, $i=1, \ldots, n$, and when $r>n$ $v_{1,n}$, $i=1, \ldots, n_{excess}$ resulting in r variables successively included in the $N_{itf}=r$ combinations of input transformed variables. For example, for the second transformation flow, $n_{excess}=r-m$ so $v_{2,i}$, $i=1, \ldots, m$, and when $r>m$ $v_{1,m}$, $i=1, \ldots, n_{excess}$ resulting in r variables successively included in the $N_{itf}=r$ combinations of input transformed variables. In summary, when $r>N_{tfi}$, $v_{i,j}=v_{i,N_{tfi}}$, $j=N_{tfi}+1, \ldots, r$, $i=1, \ldots, N_{tf}$.

For each tuple, the synthesize operation further determines how a synthesized variable value is computed from each combination of the input transformed variables. The possible methods to compute the synthesized variable value of each tuple depend on whether the transformed variables that are input to the interaction transformation flow are all interval variables or include at least one nominal variable. In the illustrative embodiment, there are three types of synthetization operations: 1) an all-interval variable synthetization that accepts interval variables as input and outputs an interval variable, 2) an all-nominal variable synthetization that accepts nominal variables as input and outputs a nominal variable using a distinct-level enumeration operation, and 3) a nominal-interval variable synthetization that accepts nominal variables and interval variables as input and outputs an interval variable using a group-by operation. The interaction transformation flow definition may include a synthetization indicator that indicates "interval", "nominal", or "nominal-interval".

The all-interval variable synthetization may combine the values of the variables included in the tuple using algebraic operators such as addition, multiplication, division (applicable to binary tuples), and linear function operators that the user may specify in the interaction transformation flow definition. A default algebraic operator may be multiplication. Due to the stateless nature of these operations, no data pass is required to compute synthesize operation data values. The variables that result from the synthetization are interval variables.

The all-nominal variable synthetization may combine the values of the variables included in the tuple by enumerating the distinct levels of the variables included in the tuple. For example, considering the tuple $(v_{1,1}, v_{2,1}, v_{3,1}, v_{4,1})$ the nominal variable synthetization enumerates the distinct levels of the variable that is a categorical-product of the input variables, such as $Z=v_{1,1}*v_{2,1}*v_{3,1}*v_{4,1}$. Assuming $c_1, c_2, c_3, c_4$ are the cardinalities of $v_{1,i}, v_{2,j}, v_{3,k}, v_{4,l}$, $i=1, \ldots, n$, $j=1, \ldots, m$, $k=1, \ldots, p$, $l=1, \ldots, q$, respectively, a maximum number of distinct values for Z is $N_Z=c_1*c_2*c_3*c_4$. Due to correlation between the variables and their levels, in most cases, the actual cardinality of Z is typically much less. The determination of the cardinality of Z requires a single data pass. During this data pass, the unique values of Z are determined and stored in a distinct-values tree that are the synthesize operation data values for a nominal variable synthetization. The variable that results from the synthesis is a nominal variable.

The nominal-interval synthetization may combine the values of the variables included in the tuple by performing a groupby aggregation. The operators may be of the form groupby (mean), groupby (standard deviation), groupby (centralized moments), etc., where the groupby method may be defined in the interaction transformation flow definition or using a default method. The groupby parameter includes one or more statistical values that are computed and used to replace values as part of the synthetization. For example, considering the tuple $(v_{1,i}, v_{2,j}, v_{3,k}, v_{4,l})$, where $v_{1,i}, v_{2,j}$, and $v_{3,k}$ are nominal variables, and $v_{4,l}$ is an interval variable, the nominal-interval variable synthetization processes each type of variable differently. For the nominal variables $v_{1,i}, v_{2,j}$, and $v_{3,k}$, the nominal-interval variable synthetization enumerates the distinct levels of the variable that is a categorical-product of the nominal input variables, such as $Z=v_{1,1}*v_{2,1}*v_{3,1}$. During the single data pass, the unique values of Z are determined and stored in a distinct-values tree. In the same data pass, the per-level statistic(s), as indicated by the groupby parameter, is/are computed for $v_{4,l}$ where each level is defined by the distinct levels of the categorical-product such as $v_{1,1}*v_{2,1}*v_{3,1}$. The per-level statistic is finalized when the data pass is complete. For example, if the groupby parameter is "mean", the mean is computed from the per-level sums of $v_{4,l}$ computed during the data pass. The finalized groupby parameter value(s) and the distinct-values tree are the synthesize operation data values for a nominal-interval synthetization. For example, Z=groupby (operator)=>stat_operator$(v_{1,i}, v_{2,j}, v_{3,k}, v_{4,l})$, where stat_operator computes the statistical value associated with the indicated operator, such as mean, standard deviation, centralized moments, etc., of each tuple. When nominal-interval synthetization is performed, for example of $v_{1,1}, v_{2,1}, v_{3,1}, v_{4,1}$, a level of $v_{1,1}*v_{2,1}*v_{3,1}$ is computed, and the value used as an output of the nominal-interval synthetization is the per-level statistic value, such as the mean, computed for the $v_{4,l}$ values that correspond to the computed level. The variable that results from the synthesis is an interval (continuous) variable.

For illustration, given second sample code below, the interaction transformation flow creates three decision trees, each with five leaves, that can be used as interaction features in training a machine learning model.

```
impute_phase=dict(method='median')
disct_phase=dict(method='quantile' args=dict(nBins=5))
p1=dict(name='tr1', inputs=['x1', 'x2', 'x3'],
    impute=impute_phase, discretize=disct_phase)
p2=p1;
p2['inputs']=['x11', 'x12', 'x15']
p3=p1;
p3['inputs']=['x121', 'x122', 'x5']
cattrans_phase=dict(method='dtree', args=dict
    (treeCrit='entropy', nBins=5))
inter_inputs=[p1['name'], p2['name'], p3['name']]
p_inter=dict(name='tr_inter', interation=dict
    (synthesizer='nominal', inputs=inter_inputs,
    targets=p_tar['name']), cattrans=cattrans_phase)
```

The inputs to the interaction transformation flow named 'tr_inter' include the variables created from three non-interaction transformation flows that each create three variables. The synthesize operation uses the default tuple indicator since one is not specified and uses the nominal variable synthetization to combine the variables defined based on the default tuple indicator. For example, when the default tuple indicator is cross mode, nine variables are created and nominal variable synthetization is applied to compute the categorical-product for each. After creating and initializing values for each variable using the synthesize operation, a cattrans operation is applied to the created, initialized variables.

In an operation 508, a status indicator may be received that indicates a success or a failure of the transformation request. Additionally, or in the alternative, a summary table may be received that provides a list of transformed variables.

In an operation 510, the received status indicator may be presented on display 216.

Referring to FIGS. 6A through 6D, example operations associated with controller data transformation application 312 are described. Additional, fewer, or different operations may be performed depending on the embodiment. The order of presentation of the operations of FIGS. 6A through 6D is not intended to be limiting. Again, controller data transformation application 312 and data transformation application 222 may be integrated or be the same applications so that the operations of FIGS. 5 and 6A through 6D are merged.

In an operation 600, the request to load the input dataset selected by the user is received.

In an operation 602, the input dataset is partitioned across each worker device 400 of worker system 106. In some embodiments, worker system 106 may not include any workers such that controller device 104 executes the operations of worker data transformation application 412 using one or more threads.

In an operation 604, the transformation request may be received from user device 200 or directly from the user of user device 200 when integrated.

In an operation 606, the plurality of transformation flow definitions is extracted from the transformation request. In an alternative embodiment, the request may include a reference to a location that is storing the plurality of transformation flow definitions. In another alternative embodiment, the plurality of transformation flow definitions may be read from a known storage location.

In an operation 608, an index value for tf is assigned to each transformation flow. For example, an index of one, tf=1, is assigned to the first transformation flow; an index of two, tf=2, is assigned to the second transformation flow; an index of three, tf=3, is assigned to the third transformation flow; an index of four, tf=4, is assigned to the fourth transformation flow; an index of five, tf=5, is assigned to the fifth transformation flow; etc.

In an operation 610, a maximum transformation order $M_{to}$ is determined. For example, a maximum order is identified from the order of each transformation flow. For illustration, considering the first sample code above, the maximum transformation order is four because the first transformation flow has four operations, which is the maximum order for any of the five defined transformation flows.

In an operation 612, a flow similarity between the plurality of transformation flows defined by the plurality of transformation flow definitions is determined. A transformation request can include a large number of transformation flows. As a result, direct (naïve) computation of the statistics that are required to define the operation data values required for each operation may introduce significant inefficiencies due to redundant computations. This can be a performance bottleneck, especially in a big data or a distributed data environment. To avoid these inefficiencies, the similarity is determined to avoid redundant intermediate computations. The flow similarity analysis is done for each operation of the transformation flows. Two transformation flows are $n^{th}$-order similar if the first n operations are similar. Flow similarity analysis is not based on the input variables and/or target variables specified for each transformation flow. Flow similarity is measured between transformation flows of the same type. For example, flow similarity is determined separately for interval transformation flows and for nominal transformation flows. For illustration, considering the first sample code above, the first transformation flow is $1^{st}$-order similar with the second transformation flow and vice versa because flow similarity is symmetric. The third transformation flow is $0^{th}$-order similar with the first transformation flow and with the second transformation flow.

For illustration, each entry in a similarity matrix $\mathcal{M}[n,n]$ is initialized to zero, where n is a number of the transformation flows.

for i=1 to n
    for j=i+1 to n
        for k=1 to np, where np is a number of operations of $tf_j$, where $tf_j$ is the $j^{th}$ transformation flow
            If the kth operation of $tf_i$, where $tf_i$ is the $i^{th}$ transformation flow, is equivalent to the kth operation of $tf_j$, $\mathcal{M}[i,j]+=1$
        end for
    end for
    end for The equivalence of two operations is dependent on the full array of options specified for those operations being identical. For example, if two operations are both imputations, but one is a mean imputation and the other is median imputation, the two operations are not equivalent. $\mathcal{M}[i,j]$ holds the similarity order of $i^{th}$ transformation flow with the $j^{th}$ transformation flow, where the similarity order of a transformation flow with itself is not computed and the similarity matrix is symmetric.

In an operation 614, a current order a is initialized to one.

In an operation 616, a set of statistical computations is defined as an $a^{th}$ order computation set. The set includes one or more tuples defined by (a, tf, v, st_type), where a is the current order selected in operation 614, tf is the transformation flow index assigned in operation 608 for the associated transformation flow, v is a variable of the associated transformation flow, and st_type is a statistic type. For illustration, considering the first sample code above, Table IV captures the statistic(s), if any, for each order and each transformation flow.

TABLE IV

| | $tf_1$ | $tf_2$ | $tf_3$ | $tf_4$ | $tf_5$ |
|---|---|---|---|---|---|
| $1^{st}$-order | mean | mean | quantile | mode | level frequency, WOE |
| $2^{nd}$-order | quantile | mean, std. dev. | min, max | level frequency | |
| $3^{rd}$-order | | min, max | | | |
| $4^{th}$-order | min, max | | | | |

The statistic(s) are determined based on the method(s) and operation(s) defined by the plurality of transformation flows and the operation data values associated with each. For example, the third operation for the first transformation flow is a log function operation that does not include any operation data values. The set of statistical computations defined for the $1^{st}$ statistical computation set for a first iteration of operation 616 includes (1, 1, x1, mean), (1, 1, x2, mean), (1, 2, x1, mean), (1, 3, x1, quantile), (1, 3, x2, quantile), (1, 3, x3, quantile), (1, 4, c1, mode), (1, 4, c2, mode), (1, 5, c1, level frequency), and (1, 5, c1, WOE).

The set of statistical computations defined for the $2^{nd}$ statistical computation set for a second iteration of operation 616 includes (2, 1, x1, quantile), (2, 1, x2, quantile), (2, 2, x1, mean), (2, 2, x1, std. dev.), (2, 3, x1, min), (2, 3, x1, max), (2, 3, x2, min), (2, 3, x2, max), (2, 3, x3, min), (2, 3, x3, max), (2, 4, c1, level frequency), (2, 4, c2, level frequency).

The set of statistical computations defined for the $3^{rd}$ statistical computation set for a third iteration of operation 616 includes (3, 2, x1, min) and (3, 2, x1, max).

The set of statistical computations defined for the 4th statistical computation set for a fourth iteration of operation 616 includes (4, 1, x1, min), (4, 1, x1, max), (4, 1, x2, min), and (4, 1, x2, max).

The set of statistical computations is created by looping through each transformation flow that has a remaining operation based on the order index, then looping through the input variables specified for the remaining operation, and then looping through the statistical parameters required for the operation and method specified for the operation, if any.

In an operation 618, a statistical computation index is assigned to each statistical computation of the set of statistical computations. For example, for a first iteration of operation 618, a statistical computation index of one is assigned to (1, 1, x1, mean); a statistical computation index of two is assigned to (1, 1, x2, mean); a statistical computation index of three is assigned to (1, 2, x1, mean); a statistical computation index of four is assigned to (1, 3, x1, quantile); a statistical computation index of five is assigned to (1, 3, x2, quantile); a statistical computation index of six is assigned to (1, 3, x3, quantile); a statistical computation index of seven is assigned to (1, 4, c1, mode); a statistical computation index of eight is assigned to (1, 4, c2, mode); a statistical computation index of nine is assigned to (1, 5, c1, level frequency); and a statistical computation index of ten is assigned to (1, 5, c1, WOE) for a=1 and tf=1, . . . , 5.

In an operation 620, any identical statistical computations without considering the transformation flow index tf are grouped. Statistical computations are identical if their reduced tuples are identical. For example, the reduced tuples include (a, v, st_type), where a is the current order selected in operation 614, v is a variable of the associated transformation flow, and st_type is a statistic type.

In an operation 622, a statistical computation is selected from each grouped set of statistical computations.

In an operation 624, the selected statistical computation from each grouped set of statistical computations is designated as active.

In an operation 626, any remaining statistical computation(s) of each grouped set of statistical computations are designated as inactive.

In an operation 628, a set of statistical computations is defined that includes any non-grouped statistical computation and the selected statistical computation designated as active for each grouped set of statistical computations. The inactive statistical computation(s) of each grouped set of statistical computations will receive the data computed for the corresponding statistical computation indicated as active, but the value will not be redundantly computed.

In an operation 630, a determination is made concerning whether there is another order for which to define a computable set of statistical computations. For example, when $a=M_{to}$, there is not another order. When there is another order, processing continues in an operation 632. When there is not another order, processing continues in an operation 634 shown referring to FIG. 6B.

In operation 632, the current order a is incremented by one. For example, a=a+1, and processing continues in operation 616.

Figure 6A:
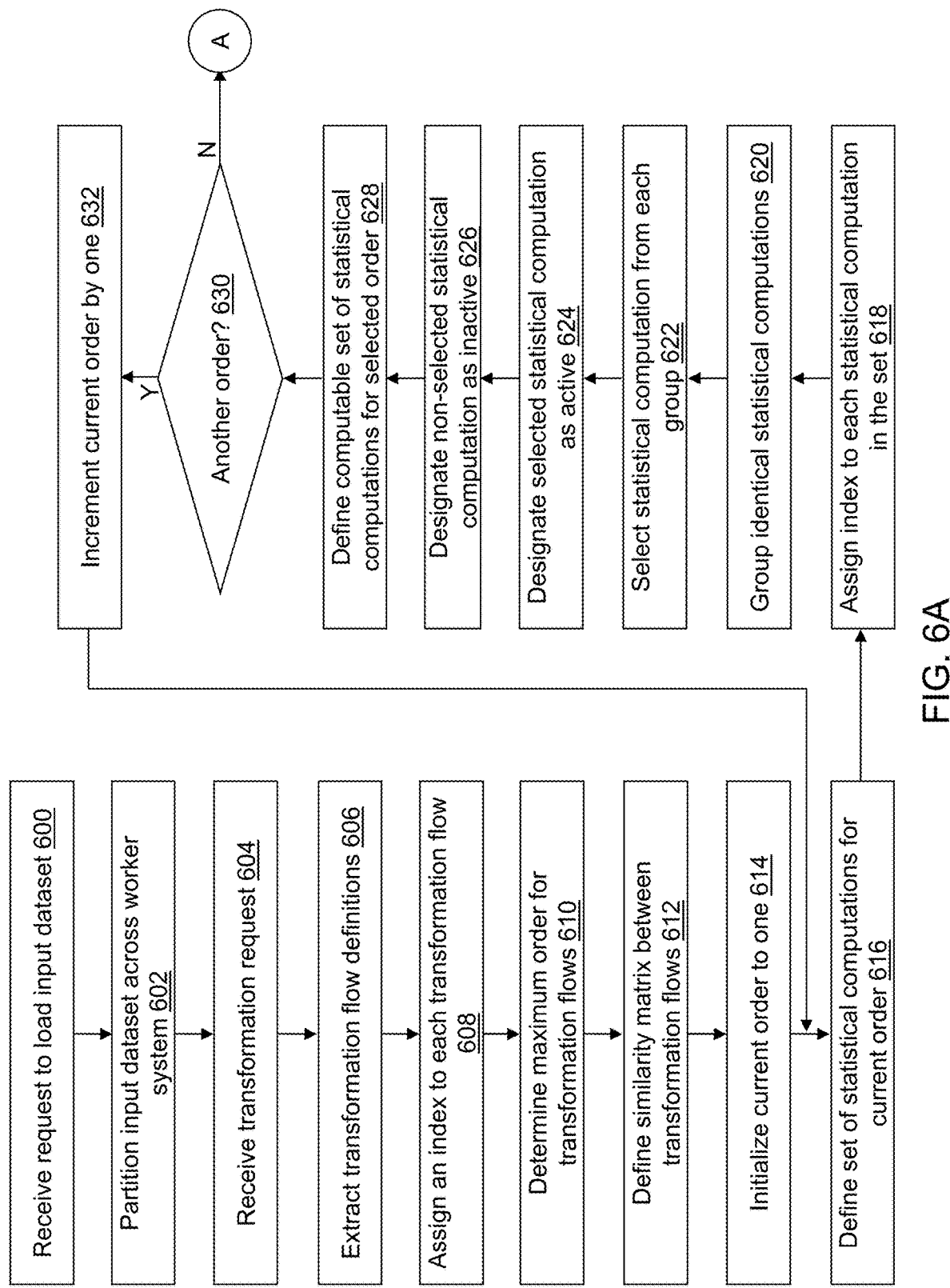
Figure 6B:

Referring to FIG. 6B, in operation 634, the current order a is re-initialized to one.

In an operation 635, the $a^{th}$ computable set of statistical computations is selected.

In an operation 636, a request is sent to each worker device 400 to compute each statistical computation of the $a^{th}$ computable set of statistical computations. For example, the request includes the tuples associated with each statistical computation included in the set to instruct each worker device 400 to compute a specific statistic type for a specific variable and associate it with the order and transformation flow defined by the tuple. If the statistical computation is associated with a discretize operation or a mapinterval operation, the statistical computation is processed in a task-parallel fashion with tasks assigned in a round-robin fashion. The discretize operation and the mapinterval operation process contingency tables so there is no data communication.

In an operation 637, the statistical results for each statistical computation of the $a^{th}$ computable set of statistical computations are received from each worker device 400.

In an operation 638, the statistical results received from each worker device 400 for each statistical computation of the $a^{th}$ computable set of statistical computations are aggregated to define operation data value(s) as needed based on each transformation flow definition. For example, when the mean of variable "x1" is computed for (1, 1, x1, mean), the statistical results for (1, 1, x1, mean) include a counter of a number of observations of "x1" and a sum of all of the observation values of "x1". The counters of the number of observations of "x1" received from each worker device 400 are added to compute an overall counter of the number of observations of "x1". The sums of the observation values of "x1" received from each worker device 400 are added to compute an overall sum of the values. A mean value is computed for "x1" by dividing the overall sum by the overall counter.

As another example, a lower threshold and an upper threshold may be estimated from overall quantile estimates using the specified method such as the IQR formula. As yet another example, the bin boundaries or cut-points for a discretize operation may be computed from overall minimum and maximum estimates using a contingency table. The contingency table is a frequency table that counts a number of occurrences of values of x (the transformation variable) and y (the target variable—if specified). The contingency table is defined based on the type of discretize operation:

For x, if bucket binning or initialization is selected for the supervised discretize operation, the cut-points of the contingency table are generated using cut-point(i)=min (x)+i*(min(x)−max(x))/m, where m is a number of rows of the contingency table that is equal to a number of splits of the x variable. For quantile binning or initialization, the cut-points are set equal to the corresponding quantiles.

For y, if specified, a number of unique values of y is determined and the unique values are used to define the columns. If y is not specified, the number of unique values is one.

During the data pass, values of x and y (in each record) are used to map the observation to one of the cells of the contingency table, and the frequency count of the mapped cell is incremented by one.

The contingency table is a final output for unsupervised discretize operations (e.g. bucket/equal-width, quantile/equal-frequency). In contrast, the contingency table is processed further to generate the final bins for supervised discretize operations such as MDLP, extended chi-merge, etc.

In an operation 639, the computed operation data values for the current order may be sent to each worker device 400 with its associated tuple information. For example, the mean value computed in operation 638 is sent to each worker device 400 in association with (1, 1, x1, mean). Each worker device 400 can apply the computed operation data values to compute values for the subsequent operation in the next order. For example, the mean value may be used to compute a subsequent operation data value. For illustration, on a second data pass, to compute a minimum value and a maximum value for a discretize operation, when a value is missing, the mean value replaces the missing value in the computations.

In an operation 640, a determination is made concerning whether there is another order for which to compute the operation data values. For example, when $a=M_{to}$, there is not another order. When there is another order, processing continues in an operation 641. When there is not another order, processing continues in an operation 642.

In operation 641, the current order a is incremented by one. For example, a=a+1, and processing continues in operation 635.

In operation 642, a request is sent to each worker device 400 to transform each variable for each transformation flow. For example, the request includes the computed operation data value for each statistical computation with its associated tuple to instruct worker device 400 to perform each transformation associated with each operation for each variable with the operation data values needed by the associated operation. The non-interaction transformation flows are performed first to define the variables input to any interaction transformation flow.

In an operation 643, a done indicator is received from each worker device 400.

Any interaction transformation flows are processed in a similar manner. In operation 644, the interaction transformation flow definitions are extracted from the transformation request.

In an operation 645, an index value for itf is assigned to each interaction transformation flow.

In an operation 646, a maximum interaction transformation order $M_{ito}$ is determined.

In an operation 647, a flow similarity between the interaction transformation flows defined by the interaction transformation flow definitions is determined.

In an operation 648, a current order a is initialized to one.

In an operation 649, a set of statistical computations is defined as an $a^{th}$ order computation set. The set of statistical computations includes any statistical computations needed for any interaction transformation flow synthesis operation that includes a nominal variable. The tuples are further created based on the tuple indicator and associated as variables with the set of statistical computations.

In an operation 650, a statistical computation index is assigned to each statistical computation of the set of statistical computations.

Figure 6C:
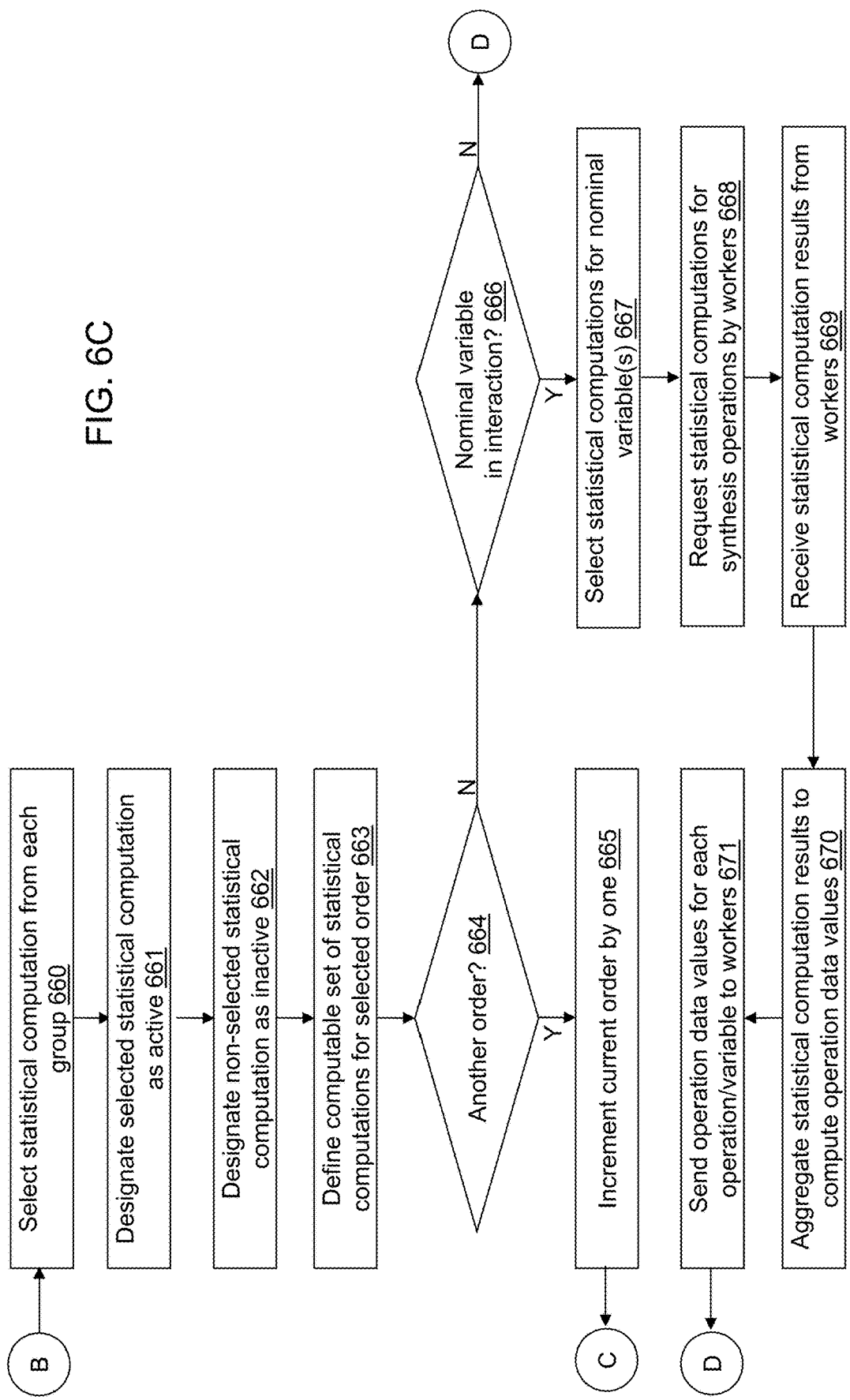

In an operation 651, any identical statistical computations without considering the interaction transformation flow index itf are grouped, and processing continues in an operation 660 shown referring to FIG. 6C.

In operation 660, a statistical computation is selected from each grouped set of statistical computations.

In an operation 661, the selected statistical computation from each grouped set of statistical computations is designated as active.

In an operation 662, any remaining statistical computation(s) of each grouped set of statistical computations are designated as inactive.

In an operation 663, a set of statistical computations is defined that includes any non-grouped statistical computation and the selected statistical computation designated as active for each grouped set of statistical computations. The inactive statistical computation(s) of each grouped set of statistical computations will receive the data computed for the corresponding statistical computation indicated as active, but the value will not be redundantly computed.

In an operation 664, a determination is made concerning whether there is another order for which to define a computable set of statistical computations. For example, when $a=M_{ito}$, there is not another order. When there is another order, processing continues in an operation 665. When there is not another order, processing continues in an operation 666.

In operation 665, the current order a is incremented by one. For example, a=a+1, and processing continues in operation 649.

In operation 666, a determination is made concerning whether any interaction transformation flow includes a nominal variable. For example, when the all-nominal variable synthetization or the nominal-interval variable synthetization is selected for any interaction transformation flow, processing continues in an operation 667. Otherwise, processing continues in an operation 680 shown referring to FIG. 6D.

Only the all-interval variable synthetization does not need a data pass to compute the synthesize operation data values. Hence, if at least one all-nominal variable synthetization or nominal-interval variable synthetization are included as part of any interaction transformation flow, a single data pass is executed for the computation of the synthesize operation data values based on the interaction transformation synthesis operation. For the all-nominal variable synthetization, the distinct trees are constructed for the synthesized variables and used for the enumeration of the distinct levels. For the nominal-interval variable synthetization, the groupby parameter value(s) and the distinct-values tree are computed.

In an operation 667, the set of statistical computations defined for each interaction transformation flow that includes a nominal variable is selected.

In an operation 668, a request is sent to each worker device 400 to compute each statistical computation of the set of statistical computations defined for each interaction transformation flow that includes a nominal variable.

In an operation 669, the statistical results for each statistical computation of the set of statistical computations defined for each interaction transformation flow that includes a nominal variable are received from each worker device 400.

In an operation 670, the statistical results received from each worker device 400 for each statistical computation of the set of statistical computations defined for each interaction transformation flow that includes a nominal variable are aggregated to define operation data value(s) as needed based on each interaction transformation flow definition.

In an operation 671, the computed operation data values for the set of statistical computations defined for each interaction transformation flow that includes a nominal variable may be sent to each worker device 400 with its associated tuple information. Processing continues in operation 680 shown referring to FIG. 6D.

Referring to FIG. 6D, in operation 680, the current order a is re-initialized to one.

In an operation 681, the $a^{th}$ computable set of statistical computations is selected.

In an operation 682, a request is sent to each worker device 400 to compute each statistical computation of the $a^{th}$ computable set of statistical computations. For example, the request includes the tuples associated with each statistical computation included in the set to instruct each worker device 400 to compute a specific statistic type for a specific variable and associate it with the order and interaction transformation flow defined by the tuple.

In an operation 683, the statistical results for each statistical computation of the $a^{th}$ computable set of statistical computations are received from each worker device 400.

In an operation 684, the statistical results received from each worker device 400 for each statistical computation of the $a^{th}$ computable set of statistical computations are aggregated to define operation data value(s) as needed based on each interaction transformation flow definition.

In an operation 685, the computed operation data values for the current order may be sent to each worker device 400 with its associated tuple information.

In an operation 686, a determination is made concerning whether there is another order for which to compute the operation data values. For example, when $a=M_{ito}$, there is not another order. When there is another order, processing continues in an operation 687. When there is not another order, processing continues in an operation 688.

In operation 687, the current order a is incremented by one. For example, a=a+1, and processing continues in operation 681.

In operation 688, a request is sent to each worker device 400 to transform each variable for each interaction transformation flow. For example, the request includes the computed operation data value for each statistical computation with its associated tuple to instruct worker device 400 to perform each interaction transformation for each variable with the operation data values needed by the associated operation.

In an operation 689, a done indicator is received from each worker device 400.

In operation 690, a done indicator is sent to user device 200. The transformed data may be stored in transformed data subset 416 at each worker device 400.

Figure 7A:
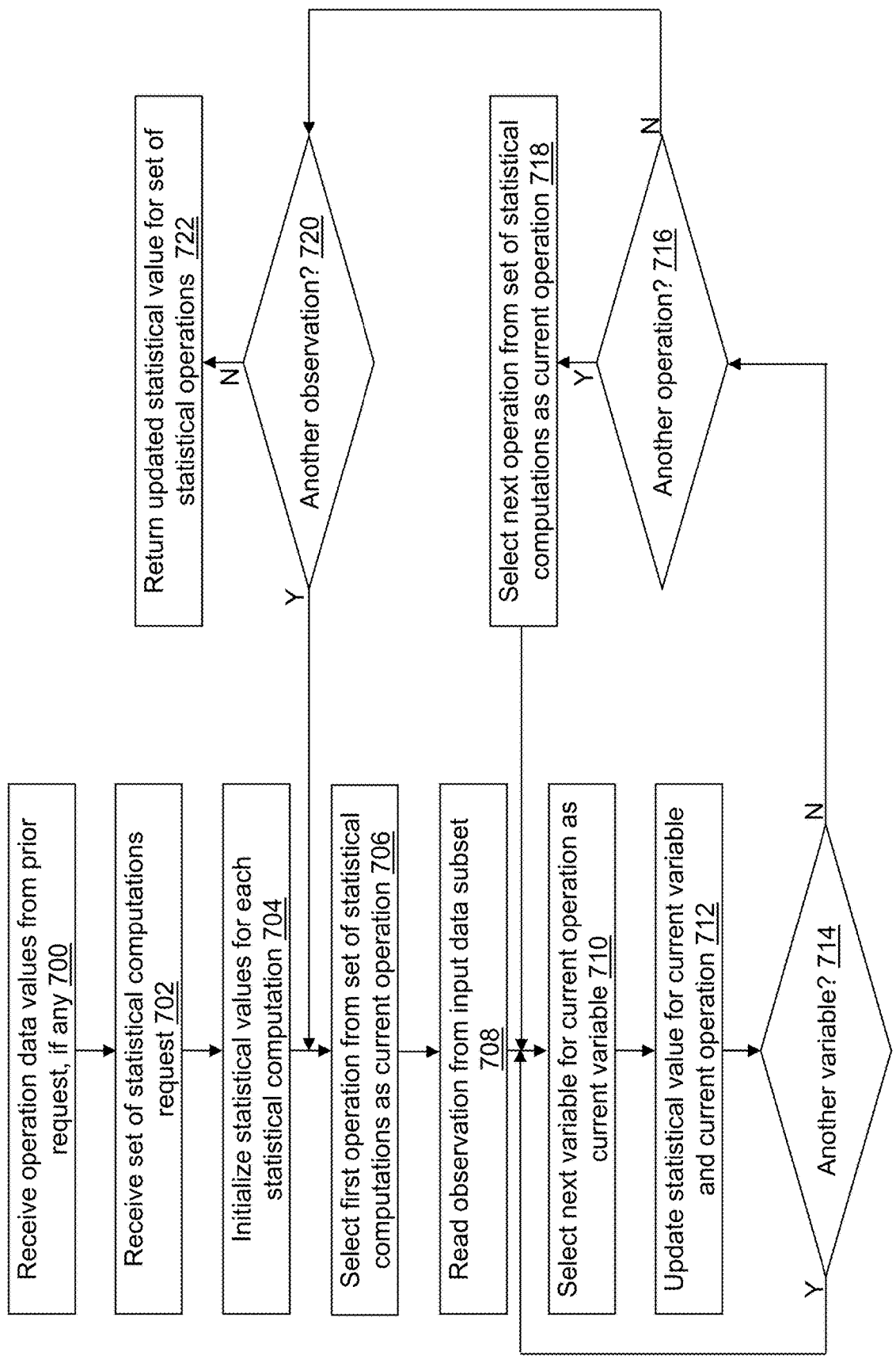
Figure 7C:
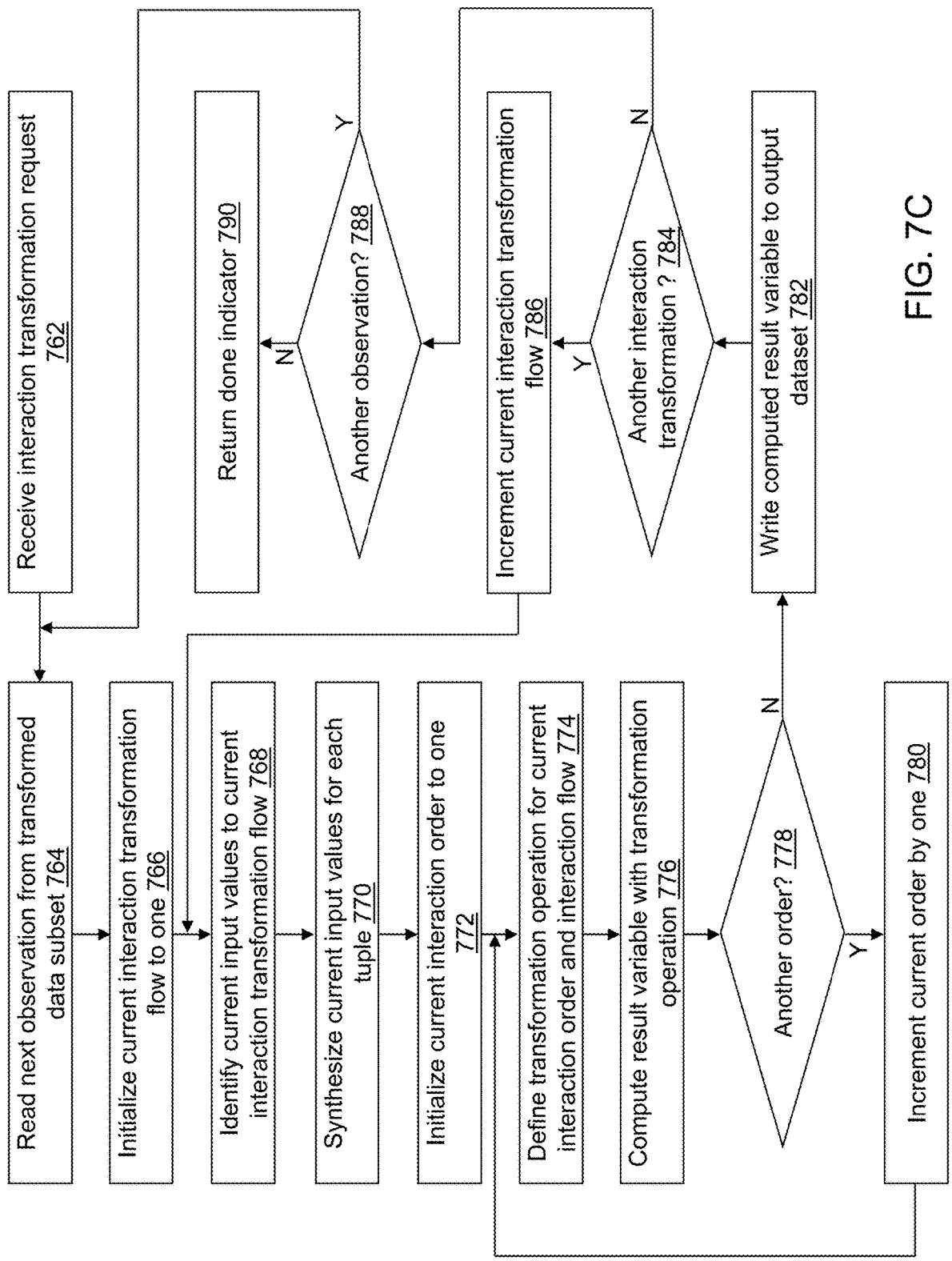

Referring to FIGS. 7A, 7B, and 7C, example operations associated with worker data transformation application 412 are described. Additional, fewer, or different operations may be performed depending on the embodiment. The order of presentation of the operations of FIGS. 7A, 7B, and 7C is not intended to be limiting. Controller data transformation application 312 and worker data transformation application 412 may be integrated or be the same applications so that the operations of FIGS. 6A, 6B, 6C, and 6D and FIGS. 7A, 7B, and 7C are merged.

A portion of the input dataset is received and loaded in third computer-readable medium 408 as input data subset 414. In an operation 700, operation data values are received from controller device 104 based on execution of operation 639, operation 671, or operation 685.

In an operation 702, the request to compute a statistical value is received. The request may include the active set of statistical computations for a current order being processing by controller device 104 for the plurality of transformation flows, any interaction transformation flow, or any synthesis operation of any interaction transformation flow that includes a nominal variable. The request may further include the set of statistical computations that includes inactive statistical computations. For illustration, for the first order provided in the example above, worker device 400 receives (1, 1, x1, mean); (1, 1, x2, mean); (1, 2, x1, mean); (1, 3, x1, quantile); (1, 3, x2, quantile); (1, 3, x3, quantile); (1, 4, c1, mode); (1, 4, c2, mode); (1, 5, c1, level frequency); and (1, 5, c1, WOE), but, in operations 620 to 628, identifies (1, 2, x1, mean) as inactive relative to (1, 1, x1, mean) because the computations are identical except for the transformation flow.

In an operation 704, statistical data values are initialized as needed for each statistical computation. For example, counters and sum values are initialized to zero. Minimum values may be initialized to a large quantity, and maximum values may be initialized to a large negative quantity. Illustrative counters include a number of observations counter value, a number of missing observations counter value, a number of unique values counter value, a number of occurrences of each unique value counter value, etc. for each statistical computation based on the type of statistical computation. Illustrative sum values include a total sum of values of each variable, a total sum of squared values of each variable, a total sum of inverse values of each variable, a total sum of difference values of each variable, etc. for each statistical computation based on the type of statistical computation.

In an operation 706, a first operation is selected from the set of statistical computations received in operation 702 as a current operation.

In an operation 708, a first observation is read from input data subset 414 to define values for each variable of the plurality of variables $v_i$.

In an operation 710, a next variable is selected as a current variable that is associated with the current operation. For example, a first variable associated with the current operation may be selected on a first iteration of operation 710 after a most recent iteration of operation 704.

In an operation 712, the statistical data value(s) associated with the current operation and the current variable are updated based on the defined value for the current variable and possibly the operation data values received in operation 700 and computed for an operation of a previous order. For example, the missing counter value is incremented for any variable for which a value is missing; the number of observations counter value is incremented; a sum of values is updated, a squared sum of values is updated, etc. As another example using operation data values received in operation 700, the mean computed in a previous impute operation may be used to impute a value for a missing value for the current variable.

In an operation 714, a determination is made concerning whether the current operation includes another variable. If the current operation includes another variable, processing continues in operation 710. If the current operation does not include another variable, processing continues in an operation 716.

In operation 716, a determination is made concerning whether the order currently being processed based on a call from operation 639 or operation 685 includes another variable. If the current order includes another operation, processing continues in operation 718. If the current order does not include another operation, processing continues in an operation 720.

In operation 718, a next operation is selected from the set of statistical computations included in the request received in operation 702 as a current operation, and processing continues in operation 710.

In an operation 716, a determination is made concerning whether input data subset 414 includes another observation. If input data subset 414 includes another observation, processing continues in operation 706. If input data subset 414 does not include another observation, processing continues in an operation 722.

In operation 722, the updated statistical data value(s) associated with each statistical computation are returned or otherwise provided to controller device 104. The updated statistical data value(s) are received by controller device 104 in one of operation 637, operation 669, or operation 683.

Referring to FIG. 7B, in an operation 730, the request to transform each variable of each transformation flow is received. For example, the received request includes the computed operation data value for each statistical computation with its associated tuple. The request may be received as a result of operation 642.

In an operation 732, a first observation is read as a current observation from input data subset 414 to define values for each variable of the plurality of variables $v_i$. Transformed data subset 416 may be opened for writing on a first row. A current row of transformed data subset 416 is the first row. When the option replace=False is selected by the user, the first observation may be written to transformed data subset 416 so that transformed values are appended to the input values read from input data subset 414. A header row may be written to the first row of transformed data subset 416 that includes a variable name for each transformed variable. For example, the variable name for each variable to transform may be appended to the "name" parameter value given to each transformation flow so that each transformed variable has a unique name. For example, in the illustrative code above, a first transformed variable may be named "pipeline1_x1", a second transformed variable may be named "pipeline1_x2", a third transformed variable may be named "pipeline2_x1", . . . , and a ninth transformed variable may be named "pipeline5_c1".

In an operation 734, a current transformation flow is initialized to one, tf=1.

In an operation 736, a variable is selected as a current variable from the current transformation flow, and a current value $V_c$ is defined as the value for the current variable selected from the current observation. For example, for the first transformation flow provided in the example code, the variable "x1" is selected as the current variable, and the current value is defined as the value of the variable "x1" of the current observation.

In an operation 738, a current order (operation) is initialized to one. For example, a=1.

In an operation 740, a transformation function is defined for the current order, the current transformation flow, and the current variable using an identifier of the operation (e.g., "impute", "function", "discretize") associated with the current order and the computed operation data value(s) associated with the current order, the current transformation flow, and the current variable. For example, the operation is matched to a function call and passed the parameters and the read value. When the In an operation 742, a result variable value V, is computed from the current value using the defined transformation function. For example, if the current value indicates that a value for the current variable selected from the current observation is missing and the operation is impute with a mean value, the defined transformation function selects the mean value provided as the computed operation internal parameter value(s) associated with the current order, the current transformation flow, and the current variable and sets the result variable value equal to the mean value. As another example, if the current operation is function(log), the defined transformation function computes a log of the current value and sets the result variable value equal to that log value. As another example, if the current operation is discretize(bucket), the defined transformation function determines in which bin of the contingency table (provided as the computed operation data value(s) associated with the current order) the current value falls and sets the result variable value equal to that bin value.

In an operation 744, a determination is made concerning whether or not there is another order or operation of the current transformation flow to process. For example, when a=$M_{tfo}$, there is not another order, where $M_{tfo}$ is a maximum order (number of operations) of the current transformation flow tf. When there is another order, processing continues in an operation 746. When there is not another order, processing continues in an operation 748.

In operation 746, the current order a is incremented by one to point to the next operation of the transformation flow and the current value is set equal to the computed result variable value $V_c=V_r$. For example, a=a+1, $V_c=V_r$, and processing continues in operation 740 to apply the next operation to the result variable value of the previous operation.

In operation 748, the computed result variable value is written to transformed data subset 416 by appending the computed result variable value to the current row as an output value of the current transformation flow for the value of the current variable.

In an operation 750, a determination is made concerning whether there is another variable to process for the current transformation flow. When there is another variable, processing continues in an operation 752. When there is not another variable, processing continues in an operation 754.

In operation 752, a next variable is selected as the current variable from the current transformation flow, a current value $V_c$ is defined as the value for the next variable selected from the current observation, and processing continues in operation 738 to apply the current transformation flow to the next variable. For example, for the first transformation flow provided in the example code, the variable "x2" is selected as the next variable, and the current value is defined as the value of the variable "x2" of the current observation.

In operation 754, a determination is made concerning whether there is another transformation flow to process. When there is another transformation flow, processing continues in an operation 756. When there is not another transformation flow, processing continues in an operation 758.

In operation 756, a next transformation flow is selected as the current transformation flow, and processing continues in operation 736 to apply the next transformation flow. For example, because indices were assigned to each transformation flow, the transformation flow may be incremented by one to index to the next transformation flow, tf=tf+1. For illustration, after processing the first transformation flow, the second transformation flow is selected as the current transformation flow.

In an operation 758, a determination is made concerning whether there is another observation to process in input data subset 414 to define values for each variable of the plurality of variables $v_i$. When there is another observation, processing continues in operation 732. When there is not another observation, processing continues in an operation 760.

In operation 760, a done indicator is sent to controller device 104 and received by controller device 104 in operation 643.

Referring to FIG. 7C, in an operation 762, the request to transform each variable of each interaction transformation flow is received. For example, the received request includes the computed operation data value for each statistical computation with its associated tuple. The request may be received as a result of operation 688.

In an operation 764, a first observation is read as a current observation from input data subset 414 to define values for each variable of the plurality of variables $v_i$ including the transformed variables written in operation 748.

In an operation 766, a current interaction transformation flow is initialized to one, tf=1.

In an operation 768, current input values are identified for the current interaction transformation flow, where the current input values are the output of a transformation flow.

In an operation 770, the variable synthesizer function associated with the current interaction transformation flow is executed with the current input values identified in operation 768 to define values for each tuple defined for the current interaction transformation flow.

In an operation 772, a current order (operation) is initialized to one. For example, a=1.

In an operation 774, a transformation function is defined for the current order and the current transformation flow for each tuple value.

In an operation 776, a result variable value $V_r$ is computed for each tuple from the defined values using the defined transformation function.

In an operation 778, a determination is made concerning whether or not there is another order or operation of the current interaction transformation flow to process. For example, when a=$M_{tfo}$, there is not another order, where $M_{tfo}$ is a maximum order (number of operations) of the current interaction transformation flow tf. When there is another order, processing continues in an operation 780. When there is not another order, processing continues in an operation 782.

In operation 780, the current order a is incremented by one to point to the next operation of the interaction transformation flow and the current value for each tuple is set equal to the computed result variable value $V_c=V_r$. For example, a=a+1, $V_c=V_r$ for each tuple, and processing continues in operation 774 to apply the next operation to the result variable value of the previous operation.

In operation 782, the computed result variable value for each tuple is written to transformed data subset 416 by appending each computed result variable value to the current row as an output value of the current interaction transformation flow for each tuple where each tuple is written to a different column.

In operation 784, a determination is made concerning whether there is another transformation flow to process. When there is another transformation flow, processing continues in an operation 786. When there is not another transformation flow, processing continues in an operation 788.

In operation 786, a next transformation flow is selected as the current transformation flow, and processing continues in operation 768 to apply the next interaction transformation flow.

In an operation 788, a determination is made concerning whether there is another observation to process in input data subset 414. When there is another observation, processing continues in operation 764. When there is not another observation, processing continues in an operation 790.

In operation 790, a done indicator is sent to controller device 104 and received by controller device 104 in operation 689.

Predictive modelling practitioners such as data scientists and statisticians, spend a significant part of their time in the data preprocessing (feature transformation and generation) operation. Data transformation application 222, controller data transformation application 312, and worker data transformation application 412 transform the input dataset without generating intermediate datasets, which saves significant computer memory for large datasets and saves computer memory, computing time, and communication time for distributed datasets. Additionally, the user can specify any number of transformation flows or interaction transformation flows with one or more operations that can be executed in parallel saving significant user time, computer memory, computing time, and communication time. For example, it is common to apply imputation to handle missing values followed by discretization/binning to handle outlier values. The workflow can be performed using a single transformation flow to avoid the generation of intermediate datasets and reduce the number of data passes because the data passes are shared across the transformation flows.

It is further beneficial to explore many feature transformation flows and interaction transformation flows. Data transformation application 222, controller data transformation application 312, and worker data transformation application 412 easily and automatically allow the user to evaluate the effect of many transformation flows and interaction transformation flows in a single execution so that the input dataset is more effectively evaluated and transformed. For example, variance reducing functional transformations such as Box-Cox and discretization/binning can be applied to highly skewed variables in a single execution in parallel and in the same data pass.

Figure 8:
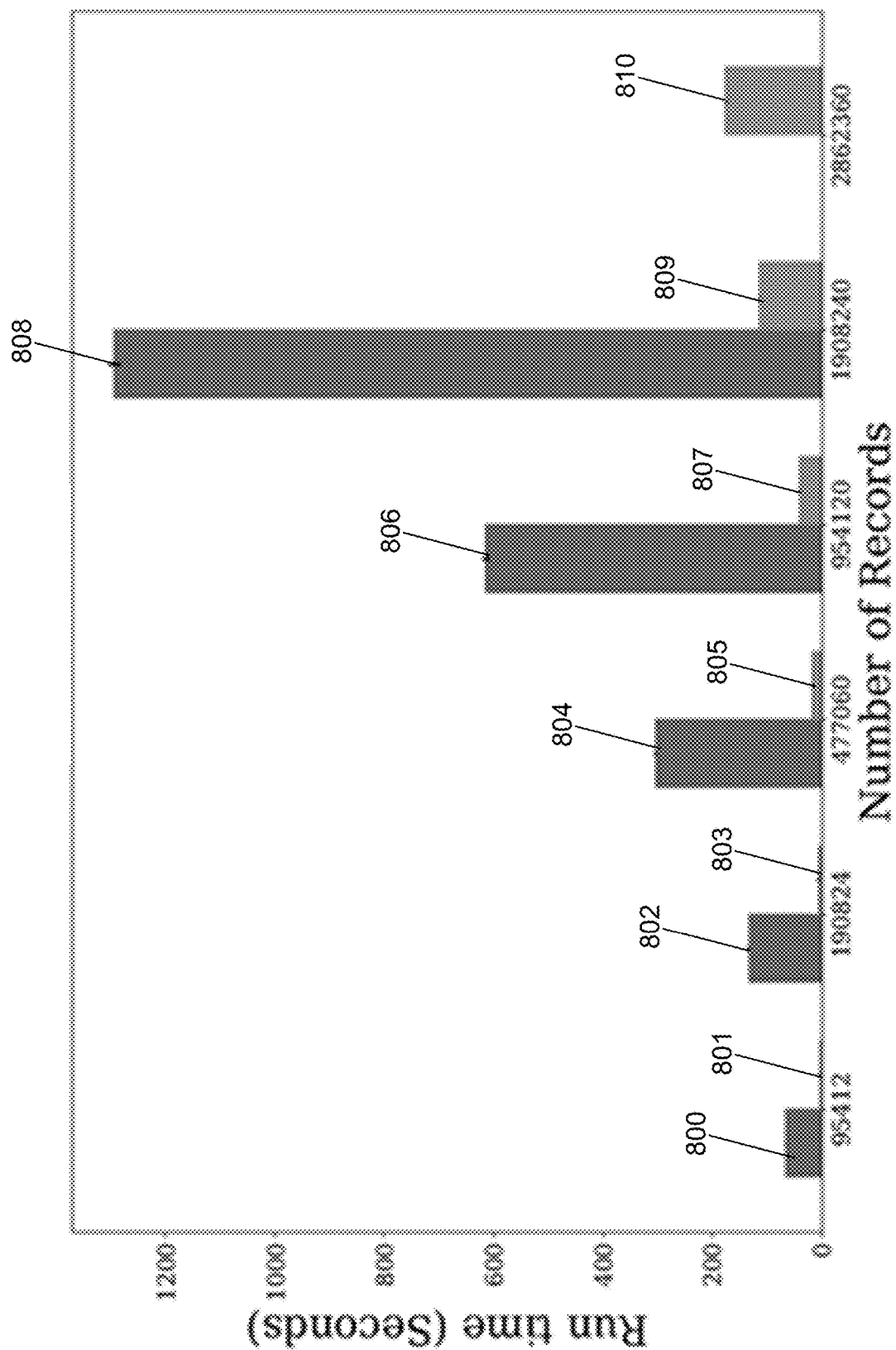
FIG. 8 shows illustrative execution time comparisons as a function of a number of records between the data transformation system of FIG. 1 with a single worker computer and a single thread and an existing data transformation system in accordance with an illustrative embodiment.

Referring to FIG. 8, a run time comparison is shown as a function of a number of records. The run time comparison is between a scikit-learn based simulation and data transformation application 222, controller data transformation application 312, and worker data transformation application 412. For a fair comparison, controller data transformation application 312 and worker data transformation application 412 were integrated and executed on a single thread of a single computing device. A simple transformation pipeline set that contained three pipelines: 1) a missing indicator, 2) a mode imputation, and 3) a nominal interaction between the two. A first bar 800 shows the run time using scikit-learn based simulation with 95412 records. A second bar 801 shows the run time using the integrated controller data transformation application 312 and worker data transformation application 412 with 95412 records. A third bar 802 shows the run time using scikit-learn based simulation with 190824 records. A fourth bar 803 shows the run time using the integrated controller data transformation application 312 and worker data transformation application 412 with 190824 records. A fifth bar 804 shows the run time using scikit-learn based simulation with 477060 records. A sixth bar 805 shows the run time using the integrated controller data transformation application 312 and worker data transformation application 412 with 477060 records. A seventh bar 806 shows the run time using scikit-learn based simulation with 954120 records. An eighth bar 807 shows the run time using the integrated controller data transformation application 312 and worker data transformation application 412 with 954120 records. A ninth bar 808 shows the run time using scikit-learn based simulation with 1908240 records. A tenth bar 809 shows the run time using the integrated controller data transformation application 312 and worker data transformation application 412 with 1908240 records. An eleventh bar 810 shows the run time using the integrated controller data transformation application 312 and worker data transformation application 412 with 2862360 records. The scikit-learn based simulation with 2862360 records did not finish.

As the results presented in FIG. 8 show, the integrated controller data transformation application 312 and worker data transformation application 412 is much more performant than the scikit-learn based simulation. One of the main reasons is the fact that, unlike the scikit-learn based simulation, the integrated controller data transformation application 312 and worker data transformation application 412 does only a single-write without generating temporary datasets. The integrated controller data transformation application 312 and worker data transformation application 412 also provide a much more comprehensive and expressive feature transformation language (and operators) that are available as part of a feature transformation language.

Figure 9:
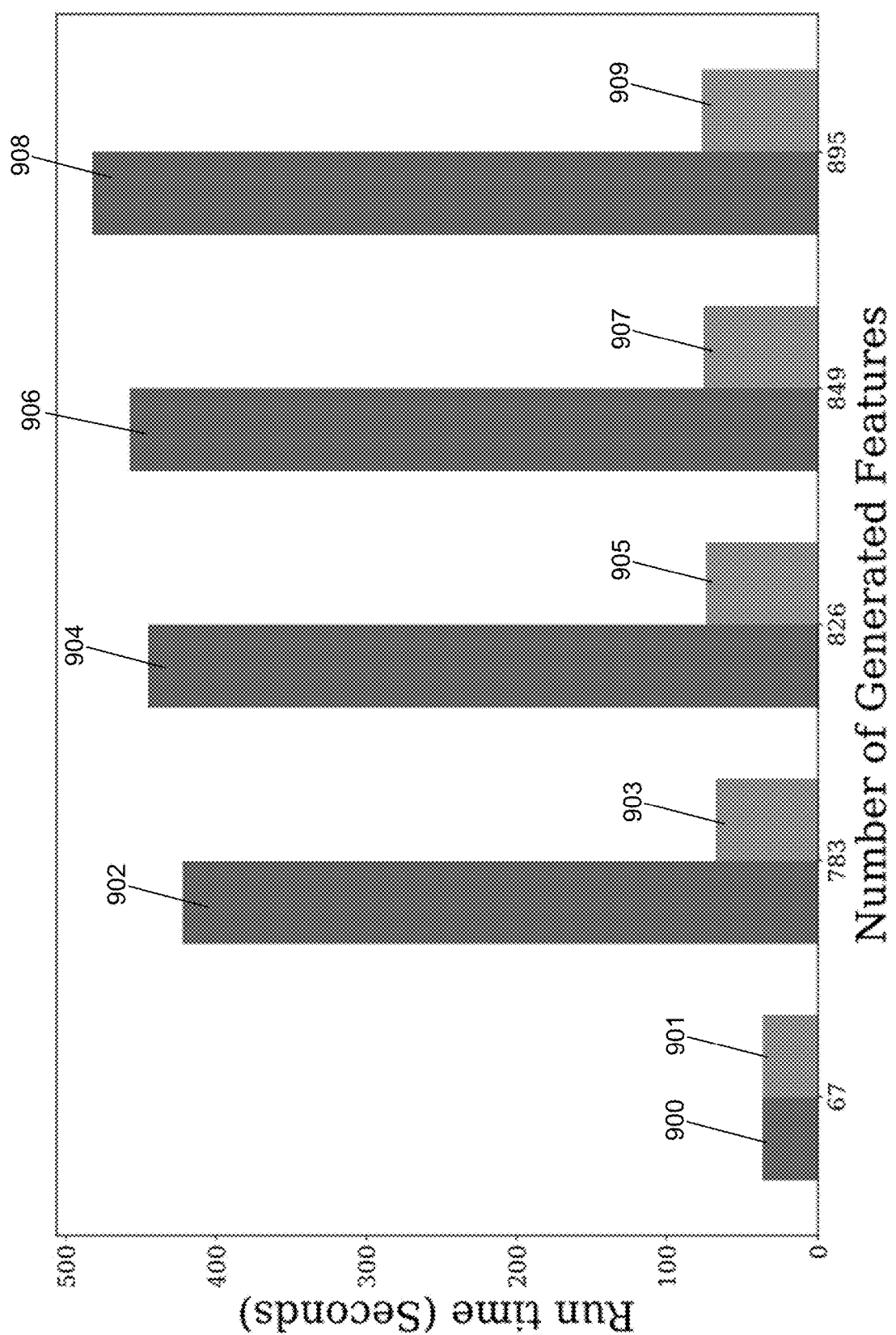
FIG. 9 depicts illustrative execution time comparisons as a function of a number of generated features between the data transformation system of FIG. 1 with the single worker computer and the single thread and the existing data transformation system in accordance with an illustrative embodiment.

Referring to FIG. 9, a run time comparison is shown as a function of a number of transformed variables. A first bar 900 shows the run time using scikit-learn based simulation with 67 transformed variables. A second bar 901 shows the run time using the integrated controller data transformation application 312 and worker data transformation application 412 with 67 transformed variables. A third bar 902 shows the run time using scikit-learn based simulation with 783 transformed variables. A fourth bar 903 shows the run time using the integrated controller data transformation application 312 and worker data transformation application 412 with 783 transformed variables. A fifth bar 904 shows the run time using scikit-learn based simulation with 826 transformed variables. A sixth bar 905 shows the run time using the integrated controller data transformation application 312 and worker data transformation application 412 with 826 transformed variables. A seventh bar 906 shows the run time using scikit-learn based simulation with 849 transformed variables. An eighth bar 907 shows the run time using the integrated controller data transformation application 312 and worker data transformation application 412 with 849 transformed variables. A ninth bar 908 shows the run time using scikit-learn based simulation with 895 transformed variables. A tenth bar 909 shows the run time using the integrated controller data transformation application 312 and worker data transformation application 412 with 895 transformed variables.

As the results presented in FIG. 9 show, the integrated controller data transformation application 312 and worker data transformation application 412 is much more performant than the scikit-learn based simulation. One of the main reasons is the fact that, unlike the scikit-learn based simulation, the integrated controller data transformation application 312 and worker data transformation application 412 avoids redundant computations that may arise during interaction synthesis and represents the results of intermediate results in compact result structures that store the operation data values for each operation and for each variable.

Figure 10:
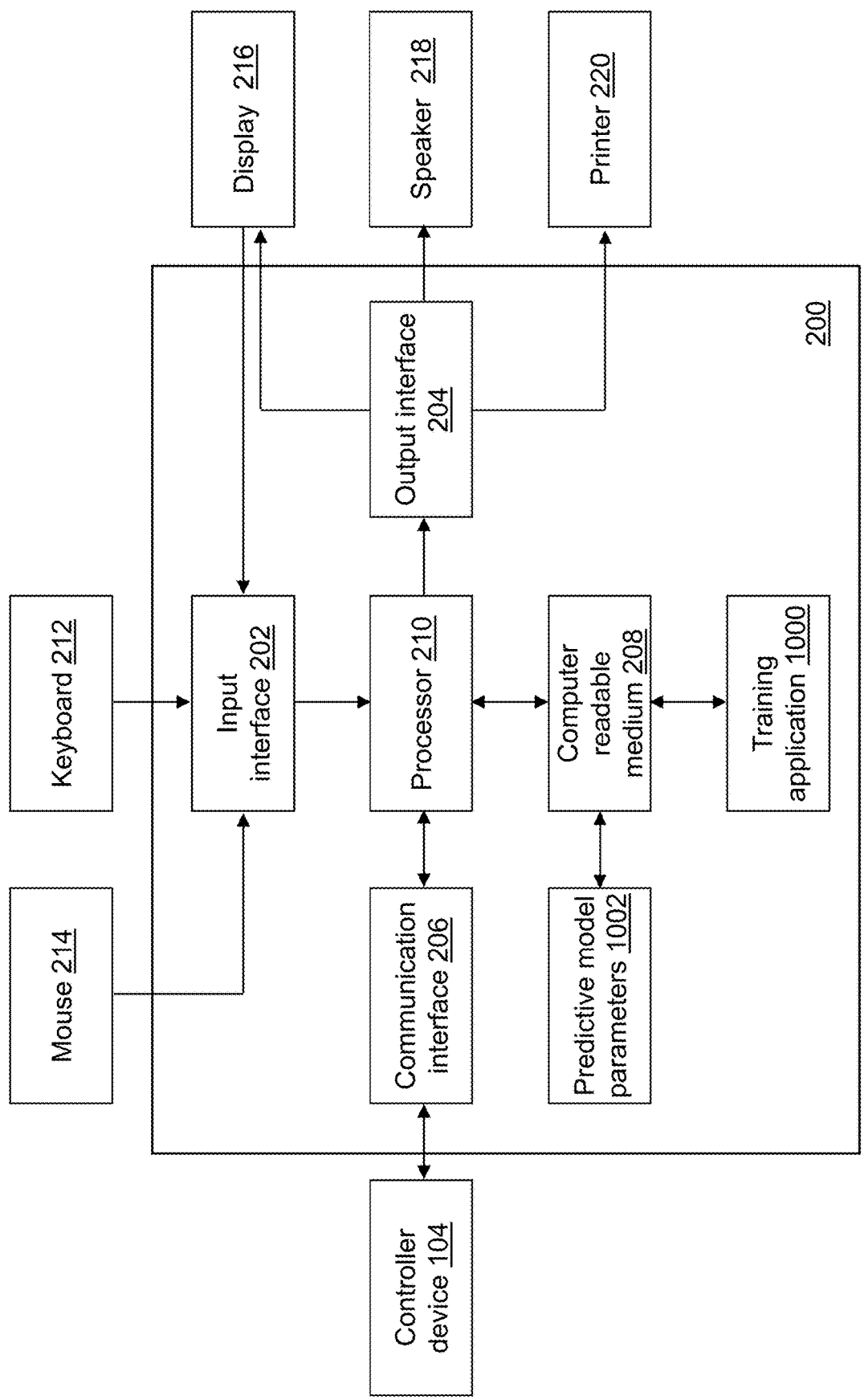
FIG. 10 depicts a block diagram of a model training device in accordance with an illustrative embodiment.

Referring to FIG. 10, a user device 200 is shown that further includes a training application 1000. Training application 1000 performs operations associated with training a model using each transformed data subset 416. The operations may be implemented using hardware, firmware, software, or any combination of these methods. Referring to the example embodiment of FIG. 10, training application 1000 is implemented in software (comprised of computer-readable and/or computer-executable instructions) stored in computer-readable medium 208 and accessible by processor 210 for execution of the instructions that embody the operations of training application 1000. Training application 1000 may be written using one or more programming languages, assembly languages, scripting languages, etc. Training application 1000 may be implemented as a Web application.

Training application 1000 may be integrated with other analytic tools including data transformation application 222. As an example, training application 1000 may be part of an integrated data analytics software application and/or software architecture such as that offered by SAS Institute Inc. of Cary, N.C., USA. For example, training application 1000 may be part of SAS® Enterprise Miner™ developed and provided by SAS Institute Inc. of Cary, N.C., USA. Merely for further illustration, training application 1000 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, and SAS® Forecast Server, all of which are developed and provided by SAS Institute Inc. of Cary, N.C., USA.

Training application 1000 performs operations associated with defining predictive model parameters 1002 from data stored in each transformed data subset 416 distributed across worker system 106. Predictive model parameters 1002 may be used to classify data stored in a scoring dataset 1224 (shown referring to FIG. 12) to support various data analysis functions as well as provide alert/messaging related to the classified data. Some or all of the operations described herein may be embodied in training application 1000. The operations may be implemented using hardware, firmware, software, or any combination of these methods.

Training application 1000 may be integrated with other system processing tools to automatically process data generated as part of operation of an enterprise, device, system, facility, etc., to identify any outliers in the processed data, to monitor changes in the data, and to provide a warning or alert associated with the monitored data using input interface 202, output interface 204, and/or communication interface 206 so that appropriate action can be initiated in response to changes in the monitored data.

Figure 11:
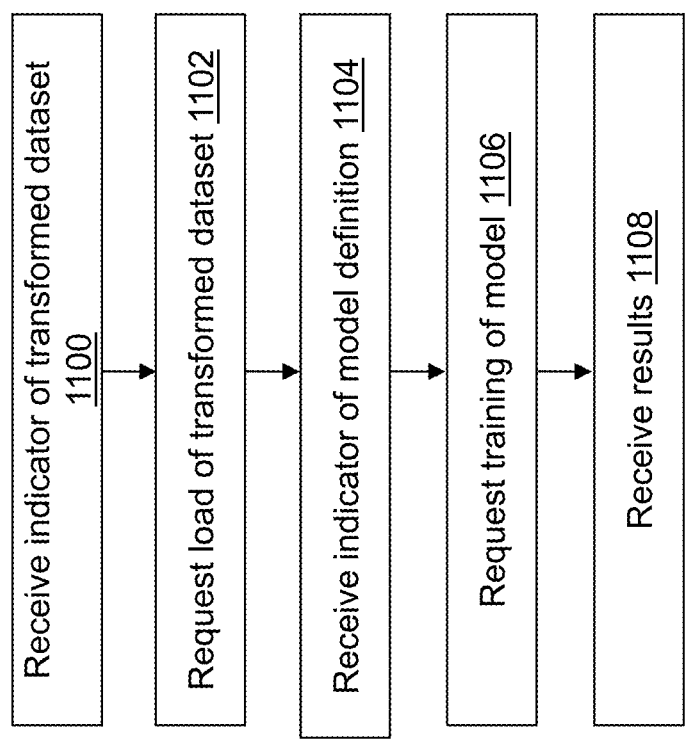
FIG. 11 depicts a flow diagram illustrating examples of operations performed by the model training device of FIG. 10 in accordance with an illustrative embodiment.

Referring to FIG. 11, example operations associated with training application 1000 are described. Additional, fewer, or different operations may be performed depending on the embodiment. The order of presentation of the operations of FIG. 11 is not intended to be limiting. A user can interact with one or more user interface windows presented to the user in a display under control of data transformation application 240 independently or through a browser application in an order selectable by the user. Although some of the operational flows are presented in sequence, the various operations may be performed in various repetitions, concurrently, and/or in other orders than those that are illustrated. A session may be established with controller device 104.

In an operation 1100, a third indicator may be received that indicates the transformed dataset. For example, the third indicator indicates a location and a name of the transformed dataset. As an example, the third indicator may be received by prediction application 1222 after selection from a user interface window or after entry by a user into a user interface window. In an alternative embodiment, the transformed dataset may not be selectable. For example, a most recently created dataset may be used automatically.

In an operation 1102, a load of the transformed dataset may be requested.

In an operation 1104, a fourth indicator of a model definition is received. For example, the model definition indicates a model type to train and any hyperparameters to use as part of the model training. Illustrative model types include a neural network model type, a gradient boosting tree model type, a decision tree model type, a forest model type, a support vector machine model type, etc.

In an operation 1106, a request to train a model of the specified model type with the transformed dataset is sent to controller device 104.

In an operation 108, results of training the model type are received and stored in predictive model parameters 1002. The results describe a predictive model. The results may be an analytic store created using the ASTORE procedure provided by the SAS Visual Data Mining and Machine Learning Procedures developed and provided by SAS Institute Inc. of Cary, N.C., USA.

Figure 12:
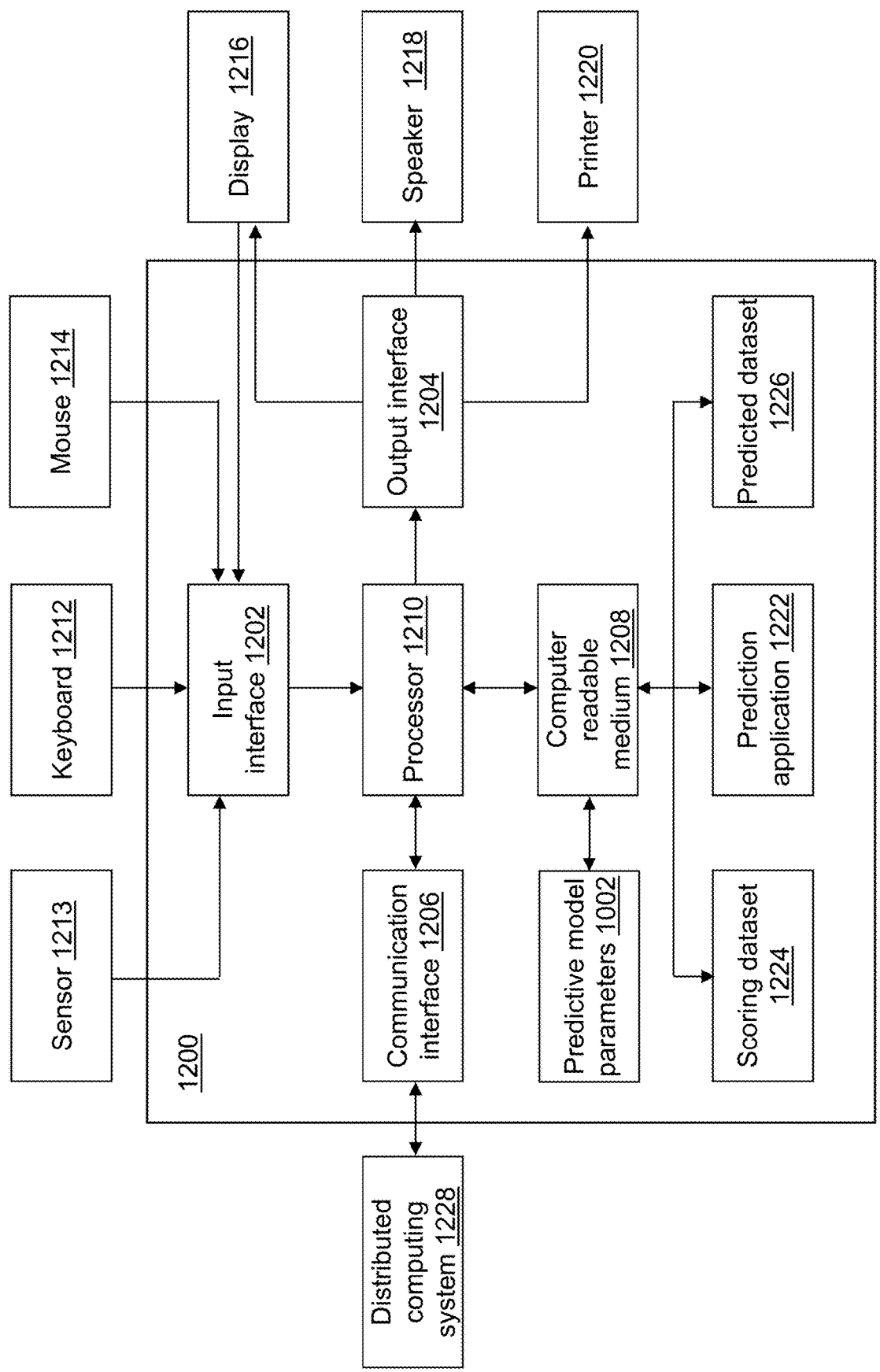
FIG. 12 depicts a block diagram of a prediction device in accordance with an illustrative embodiment.

Referring to FIG. 12, a block diagram of a prediction device 1200 is shown in accordance with an illustrative embodiment. Prediction device 1200 may include a fourth input interface 1202, a fourth output interface 1204, a fourth communication interface 1206, a fourth non-transitory computer-readable medium 1208, a fourth processor 1210, a prediction application 1222, predictive model parameters 1002, scoring dataset 1224, and predicted dataset 1226. Fewer, different, and/or additional components may be incorporated into prediction device 1200. Prediction device 1200 and user device 200 and/or controller device 104 may be the same or different devices.

Fourth input interface 1202 provides the same or similar functionality as that described with reference to input interface 202 of user device 200 though referring to prediction device 1200. Fourth output interface 1204 provides the same or similar functionality as that described with reference to output interface 204 of user device 200 though referring to prediction device 1200. Fourth communication interface 1206 provides the same or similar functionality as that described with reference to communication interface 206 of user device 200 though referring to prediction device 1200. Data and messages may be transferred between prediction device 1200 and a distributed computing system 1228 using fourth communication interface 1206. Fourth computer-readable medium 1208 provides the same or similar functionality as that described with reference to computer-readable medium 208 of user device 200 though referring to prediction device 1200. Fourth processor 1210 provides the same or similar functionality as that described with reference to processor 210 of user device 200 though referring to prediction device 1200.

Prediction application 1222 performs operations associated with classifying or predicting a characteristic of each observation of scoring dataset 1224 that is stored in predicted dataset 1226 to support various data analysis functions as well as provide alert/messaging related to the classified/predicted data. Dependent on the type of data stored in the input dataset and scoring dataset 1224, prediction application 1222 may identify anomalies as part of process control, for example, of a manufacturing process, for machine condition monitoring, for example, an electrocardiogram device, for image classification, for intrusion detection, for fraud detection, etc. Some or all of the operations described herein may be embodied in prediction application 1222. The operations may be implemented using hardware, firmware, software, or any combination of these methods.

Referring to the example embodiment of FIG. 12, prediction application 1222 is implemented in software (comprised of computer-readable and/or computer-executable instructions) stored in fourth computer-readable medium 1208 and accessible by fourth processor 1210 for execution of the instructions that embody the operations of prediction application 1222. Prediction application 1222 may be written using one or more programming languages, assembly languages, scripting languages, etc. Prediction application 1222 may be integrated with other analytic tools. As an example, prediction application 1222 may be part of an integrated data analytics software application and/or software architecture such as that offered by SAS Institute Inc. of Cary, N.C., USA. For example, prediction application 1222 may be part of SAS® Enterprise Miner™ developed and provided by SAS Institute Inc. of Cary, N.C., USA. Merely for further illustration, prediction application 1222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, and SAS® Forecast Server, all of which are developed and provided by SAS Institute Inc. of Cary, N.C., USA. One or more operations of prediction application 1222 further may be performed by an ESPE. Prediction application 1222, data transformation application 222, controller data transformation application 312, worker data transformation application 412, and/or training application 1000 may be the same or different applications that are integrated in various manners to transform data used to train and execute a model using scoring dataset 1224.

Prediction application 1222 may be implemented as a Web application. Prediction application 1222 may be integrated with other system processing tools to automatically process data generated as part of operation of an enterprise, to classify data in the processed data, and/or to provide a warning or alert associated with the data classification using fourth input interface 1202, fourth output interface 1204, and/or fourth communication interface 1206 so that appropriate action can be initiated in response. For example, a warning or an alert may be presented using a second display 1216, a second speaker 1218, a second printer 1220, etc. or sent to one or more computer-readable media, display, speaker, printer, etc. of distributed computing system 1228.

The input dataset and scoring dataset 1224 may be generated, stored, and accessed using the same or different mechanisms. Similar to the input dataset, scoring dataset 1224 may include a plurality of rows and a plurality of columns with the plurality of rows referred to as observations or records, and the columns referred to as variables that are associated with an observation. Scoring dataset 1224 may be transposed.

Scoring dataset 1224 may be stored on fourth computer-readable medium 1208 or on one or more computer-readable media of distributed computing system 1228 and accessed by prediction device 1200 using fourth communication interface 1206. Data stored in scoring dataset 1224 may be a sensor measurement or a data communication value, for example, from a sensor 1213, may be generated or captured in response to occurrence of an event or a transaction, generated by a device such as in response to an interaction by a user with the device, for example, from a second keyboard 1212 or a second mouse 1214, etc. The data stored in scoring dataset 1224 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in scoring dataset 1224 may be captured at different time points periodically, intermittently, when an event occurs, etc. One or more columns may include a time value. Similar to the input dataset, data stored in scoring dataset 1224 may be generated as part of the IoT, and some or all data may be pre- or post-processed by an ESPE.

Scoring dataset 1224 may be stored in various compressed formats such as a coordinate format, a compressed sparse column format, a compressed sparse row format, etc. Scoring dataset 1224 further may be stored using various structures as known to those skilled in the art including a file system, a relational database, a system of tables, a structured query language database, etc. on prediction device 1200 and/or on prediction application 1222. Prediction device 1200 and/or prediction application 1222 may coordinate access to scoring dataset 1224 that is distributed across worker system 106 and/or controller device 104. For example, scoring dataset 1224 may be stored in a cube distributed across a grid of computers as understood by a person of skill in the art. As another example, scoring dataset 1224 may be stored in a multi-node Hadoop® cluster. As another example, scoring dataset 1224 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in scoring dataset 1224.

Figure 13:
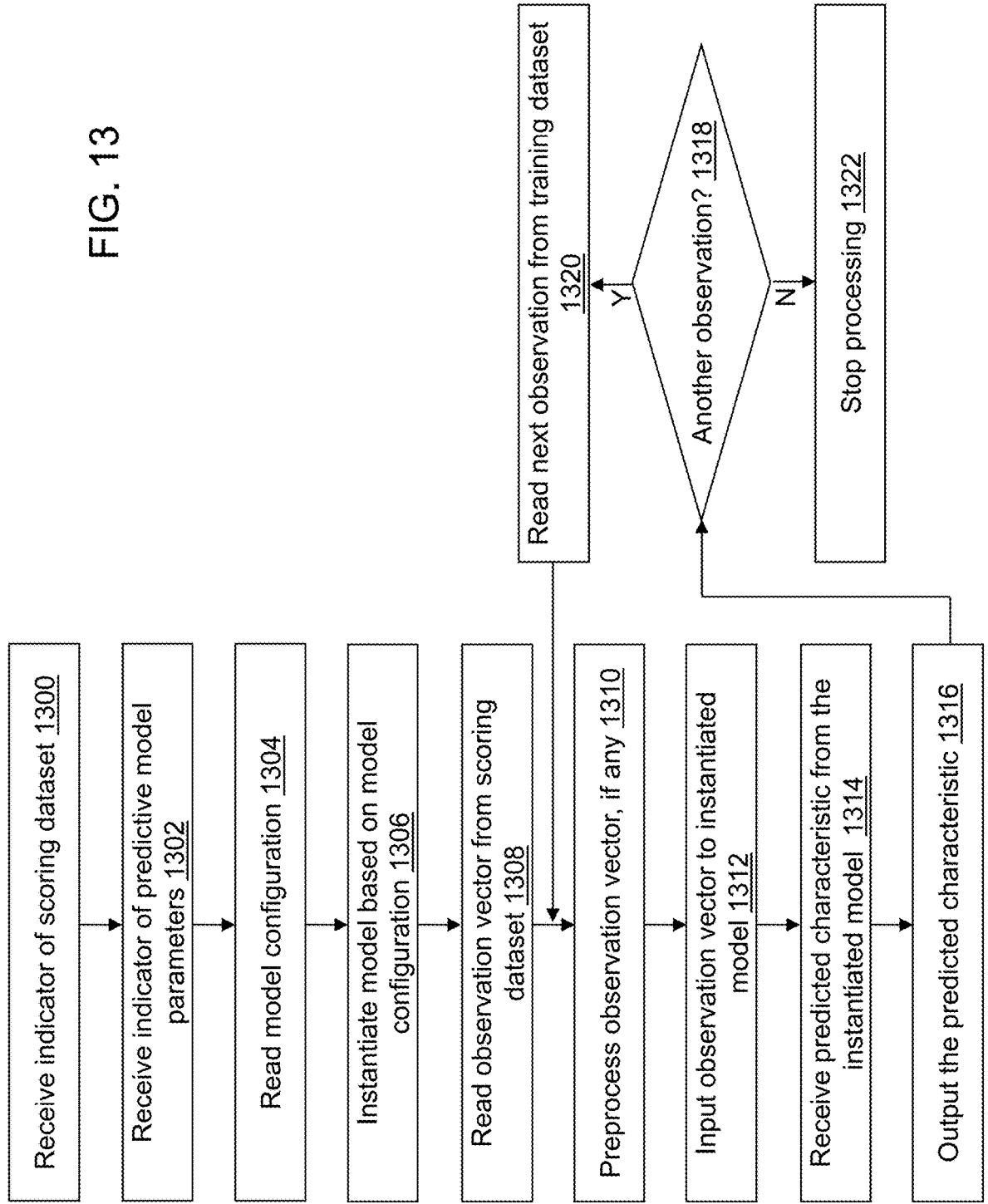
FIG. 13 depicts a flow diagram illustrating examples of operations performed by the prediction device of FIG. 12 in accordance with an illustrative embodiment.

Referring to FIG. 13, example operations of prediction application 1222 are described. Additional, fewer, or different operations may be performed depending on the embodiment of prediction application 1222. The order of presentation of the operations of FIG. 12 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1300, a fifth indicator may be received that indicates scoring dataset 1224. For example, the fifth indicator indicates a location and a name of scoring dataset 1224. As an example, the fifth indicator may be received by prediction application 1222 after selection from a user interface window or after entry by a user into a user interface window. In an alternative embodiment, scoring dataset 1224 may not be selectable. For example, a most recently created dataset may be used automatically.

In an operation 1302, a sixth indicator may be received that indicates predictive model parameters 1002. For example, the sixth indicator indicates a location and a name of predictive model parameters 1002. As an example, the sixth indicator may be received by prediction application 1222 after selection from a user interface window or after entry by a user into a user interface window. In an alternative embodiment, predictive model parameters 1002 may not be selectable. For example, a most recently created model configuration data may be used automatically. As another example, predictive model parameters 1002 may be provided automatically as part of integration with training application 1000.

In an operation 1304, a model configuration is read from predictive model parameters 1002.

In an operation 1306, a model is instantiated with the read model configuration. For example, the type of model, its hyperparameters, and other characterizing elements are read and used to instantiate the model trained using the transformed input dataset.

In an operation 1308, an observation vector is read from scoring dataset 1224.

In an operation 1310, the observation vector is pre-processed, if any preprocessing is performed.

In an operation 1312, the optionally pre-processed observation vector is input to the instantiated model.

In an operation 1314, an output of the instantiated model is received. The output may indicate a predicted characteristic computed from the observation vector using the instantiated model.

In an operation 1316, the predicted characteristic may be output, for example, by storing the predicted characteristic with the observation vector to predicted dataset 1226. In addition, or in the alternative, the predicted characteristic may be presented on second display 1216, printed on second printer 1220, sent to another computing device using fourth communication interface 1206, an alarm or other alert signal may be sounded through second speaker 1218, etc.

In an operation 1318, a determination is made concerning whether scoring dataset 1224 includes another observation vector. When scoring dataset 1224 includes another observation vector, processing continues in an operation 1320. When scoring dataset 1224 does not include another observation vector, processing continues in an operation 1322.

In operation 1320, a next observation vector is read from scoring dataset 1224, and processing continues in operation 1310.

In operation 1322, processing stops and cleanup is performed as needed.

The explosion of digital data is generating many opportunities for big data analytics, which in turn provides many opportunities for analyzing the data and grouping variables to capitalize on the information contained in the data—to make better predictions that lead to better decisions.

Transformation system 100 outputs a hierarchical variable grouping in which the groups are characterized by comprehensive and multi-dimensional statistical metrics that can be consumed in downstream analytics by systems that perform pipelined variable transformations. An example of such a system is data transformation application 222, controller data transformation application 312, and worker data transformation application 412. Additionally, transformation system 100 can generate a complete array of meta-learning dataset features beneficial to meta-learning systems as these features can capture salient features of datasets that are difficult to capture with traditional, individual (non-interacting) features. Transformation system 100 also can be used for effective visualization of data quality problems in modern datasets that are typically characterized by large dimensions, which is important because it helps the user select the proper algorithms for application in downstream analytics.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   create a transformed dataset that includes a variable value computed for each variable of a plurality of transformed variables, wherein the plurality of transformed variables are computed from a prior execution of a transformation flow applied to an input dataset;
   (A) receive an interaction transformation flow definition, wherein the interaction transformation flow definition indicates a subset of the plurality of transformed variables, a synthesis definition, and one or more interaction transformation operations to apply to the plurality of transformed variables, wherein the synthesis definition describes how the subset of the plurality of transformed variables are combined to compute a value input to the one or more interaction transformation operations;
   (B) define a plurality of variable combinations of the subset of the plurality of transformed variables based on the synthesis definition;
   (C) define a computation for each combination of the defined plurality of variable combinations and for each interaction transformation operation of the one or more interaction transformation operations;
   (D) compute an operation data value for each defined computation from a plurality of observation vectors read from the transformed dataset, wherein each observation vector of the plurality of observation vectors includes a plurality of values, wherein each value of the plurality of values is associated with a different variable of the plurality of transformed variables;
   (E) read an observation vector from the transformed dataset to define a variable value for each variable of the plurality of transformed variables;
   (F) synthesize a current interaction variable value for each combination of the defined plurality of variable combinations using the defined variable value for each variable of the plurality of transformed variables included in a respective combination of the defined plurality of variable combinations;
   (G) select a current interaction transformation operation from the one or more interaction transformation operations;
   (H) select the computed operation data value for the selected current interaction transformation operation;
   (I) define a transformation function with the selected, computed operation data value based on the selected current interaction transformation operation;
   (J) compute a result value for each combination of the defined plurality of variable combinations by executing the defined transformation function with the current interaction variable value defined for the respective combination of the defined plurality of variable combinations;
   (K) repeat (H) to (J) with each remaining transformation operation of the one or more interaction transformation operations as the selected current interaction transformation operation and with the current interaction variable value equal to the computed result value for each combination of the defined plurality of variable combinations;
   (L) output the computed result value to a second transformed dataset; and
   (M) repeat (E) to (L) with each remaining observation vector stored in the transformed dataset.

2. The non-transitory computer-readable medium of claim 1, wherein the second transformed dataset is the transformed dataset.

3. The non-transitory computer-readable medium of claim 1, wherein a plurality of interaction transformation flow definitions are received in (A), and the computer-readable instructions further cause the computing device to:
   after (A) and before (E), repeat (B) to (D) with the synthesis definition of each remaining interaction transformation flow definition of the plurality of interaction transformation flow definitions; and
   after (E) and before (M), repeat (F) to (L) with the synthesis definition of each remaining interaction transformation flow definition of the plurality of interaction transformation flow definitions, wherein the plurality of variable combinations and the one or more interaction transformation operations are associated with a respective synthesis definition.

4. The non-transitory computer-readable medium of claim 1, wherein the subset of the plurality of transformed variables includes all of the plurality of transformed variables.

5. The non-transitory computer-readable medium of claim 1, wherein the plurality of variable combinations of the subset of the plurality of transformed variables are defined by forming a Cartesian product of the subset of the plurality of transformed variables from different transformation flows applied to the input dataset.

6. The non-transitory computer-readable medium of claim 5, wherein a number of combinations of the plurality of variable combinations is $N=N_{tf,1}* \ldots *N_{tf,N_{tf}}$, where $N_{tf}$ is a number of the different transformation flows applied to the input dataset based on the synthesis definition, and $N_{tf,i}$ is a number of transformed variables created by an $i^{th}$ different transformation flow of the different transformation flows, where $i=1, \ldots, N_{tf}$.

7. The non-transitory computer-readable medium of claim 6, wherein each Cartesian product is defined using $(v_{1,i}, \ldots, v_{N_{tf},l})$, $i=1, \ldots, N_{tf,1}, \ldots, l=1, \ldots, N_{tf,N_{tf}}$.

8. The non-transitory computer-readable medium of claim 1, wherein the plurality of variable combinations of the subset of the plurality of transformed variables are defined by forming position-ordered groups of the subset of the plurality of transformed variables from different transformation flows applied to the input dataset.

9. The non-transitory computer-readable medium of claim 8, wherein a number of combinations of the plurality of variable combinations is $r=\max(N_{tf,i})$, $i=1, \ldots, N_{tf}$, where $N_{tf}$ is a number of the different transformation flows applied to the input dataset based on the synthesis definition, and $N_{tf,i}$ is a number of transformed variables created by an $i^{th}$ different transformation flow of the different transformation flows.

10. The non-transitory computer-readable medium of claim 9, wherein each position-ordered group of the position-ordered groups is defined using $(v_{1,i}, \ldots, v_{N_{tf},r})$, $i=1, \ldots, r$, where, when $r>N_{tf,i}$, $v_{i,j}=v_{i,N_{tf,i}}$, $j=N_{tf,i}+1, \ldots, r$, $i=1, \ldots, N_{tf}$.

11. The non-transitory computer-readable medium of claim 1, wherein, after (D) and before (E) and when the plurality of transformed variables includes at least one first variable having a nominal variable type and at least one second variable having an interval variable type, the computer-readable instructions further cause the computing device to:
- define a synthesis computation based on a group by aggregation of a predefined operator type; and
- compute a synthesis operation data value for the defined synthesis computation for each combination of the defined plurality of variable combinations using the plurality of observation vectors read from the transformed dataset.

12. The non-transitory computer-readable medium of claim 11, wherein the predefined operator type is selected from the group consisting of a mean, a standard deviation, and centralized moments.

13. The non-transitory computer-readable medium of claim 11, wherein the synthesis operation data value is one or more statistical values computed based on the predefined operator type.

14. The non-transitory computer-readable medium of claim 1, wherein, after (D) and before (E) and when a variable type of each variable of the plurality of transformed variables is a nominal variable type, the computer-readable instructions further cause the computing device to:
- compute a cardinality of a categorical-product of each combination of the defined plurality of variable combinations using the plurality of observation vectors read from the transformed dataset.

15. The non-transitory computer-readable medium of claim 14, wherein the unique values of the categorical-product of each combination of the defined plurality of variable combinations are stored in a distinct-values tree while computing the cardinality of the categorical-product.

16. The non-transitory computer-readable medium of claim 1, wherein, when a variable type of each variable of the plurality of transformed variables is an interval variable type, synthesizing the current interaction variable value uses a mathematical function with respective values of the defined variable value for each variable of the plurality of transformed variables included in a respective combination of the defined plurality of variable combinations.

17. The non-transitory computer-readable medium of claim 16, wherein the mathematical function is selected from the group consisting of addition, multiplication, and division.

18. The non-transitory computer-readable medium of claim 16, wherein the mathematical function is a predefined linear function.

19. The non-transitory computer-readable medium of claim 16, wherein a variable type created by synthesizing the current interaction variable value is an interval variable type.

20. The non-transitory computer-readable medium of claim 1, wherein, when a variable type of each variable of the plurality of transformed variables is a nominal variable type, synthesizing the current interaction variable value comprises computing a categorical product of the respective values of the defined variable value for each variable of the plurality of transformed variables included in a respective combination of the defined plurality of variable combinations by enumerating distinct levels of each variable of the plurality of transformed variables included in a respective combination of the defined plurality of variable combinations.

21. The non-transitory computer-readable medium of claim 20, wherein a variable type created by synthesizing the current interaction variable value is a nominal variable type.

22. The non-transitory computer-readable medium of claim 1, wherein, when the plurality of transformed variables includes at least one first variable having a nominal variable type and at least one second variable having an interval variable type, synthesizing the current interaction variable value comprises computing a categorical product of the respective values of the defined variable value for each first variable included in a respective combination of the defined plurality of variable combinations that include the at least one first variable by enumerating distinct levels of each first variable included in a respective combination of the defined plurality of variable combinations, and synthesizing the current interaction variable value uses a mathematical function with respective values of the defined variable value for each second variable included in a respective combination of the defined plurality of variable combinations that include the at least one second variable.

23. The non-transitory computer-readable medium of claim 22, wherein a variable type created by synthesizing the current interaction variable value is an interval variable type.

24. The non-transitory computer-readable medium of claim 1, wherein the transformed dataset is distributed across a plurality of computing devices.

25. The non-transitory computer-readable medium of claim 24, wherein (A) to (I) are performed by each computing device of the plurality of computing devices on a portion of the transformed dataset stored on a respective computing device.

26. The non-transitory computer-readable medium of claim 25, wherein computing the operation data value for each defined computation is performed by each computing device of the plurality of computing devices on the portion of the transformed dataset stored on the respective computing device.

27. The non-transitory computer-readable medium of claim 1, wherein, after (I), the computer-readable instructions further cause the computing device to:
- train a machine learning model of a predefined model type with the second transformed dataset; and
- store the trained machine learning model.

28. The non-transitory computer-readable medium of claim 27, wherein the computer-readable instructions further cause the computing device to:
- read an observation vector from a second dataset;
- instantiate a prediction model from the trained model;
- compute a predicted characteristic of the read observation vector using the instantiated prediction model; and
- output the computed predicted characteristic of the read observation vector.

29. A computing device comprising:
a processor; and
a non-transitory computer-readable medium operably coupled to the processor, the non-transitory computer-readable medium having computer-readable instructions stored thereon
that, when executed by the processor, cause the computing device to create a transformed dataset that includes a variable value computed for each variable of a plurality of transformed variables, wherein the plurality of transformed variables are computed from a prior execution of a transformation flow applied to an input dataset:
(A) receive an interaction transformation flow definition, wherein the interaction transformation flow definition indicates a subset of the plurality of transformed variables, a synthesis definition, and one or more interaction transformation operations to apply to the plurality of transformed variables, wherein the synthesis definition describes how the subset of the plurality of transformed variables are combined to compute a value input to the one or more interaction transformation operations;
- (B) define a plurality of variable combinations of the subset of the plurality of transformed variables based on the synthesis definition;
- (C) define a computation for each combination of the defined plurality of variable combinations and for each interaction transformation operation of the one or more interaction transformation operations;
- (D) compute an operation data value for each defined computation from a plurality of observation vectors read from the transformed dataset, wherein each observation vector of the plurality of observation vectors includes a plurality of values, wherein each value of the plurality of values is associated with a different variable of the plurality of transformed variables;
- (E) read an observation vector from the transformed dataset to define a variable value for each variable of the plurality of transformed variables;
- (F) synthesize a current interaction variable value for each combination of the defined plurality of variable combinations using the defined variable value for each variable of the plurality of transformed variables included in a respective combination of the defined plurality of variable combinations;
- (G) select a current interaction transformation operation from the one or more interaction transformation operations;
- (H) select the computed operation data value for the selected current interaction transformation operation;
- (I) define a transformation function with the selected, computed operation data value based on the selected current interaction transformation operation;
- (J) compute a result value for each combination of the defined plurality of variable combinations by executing the defined transformation function with the current interaction variable value defined for the respective combination of the defined plurality of variable combinations;
- (K) repeat (H) to (J) with each remaining transformation operation of the one or more interaction transformation operations as the selected current interaction transformation operation and with the current interaction variable value equal to the computed result value for each combination of the defined plurality of variable combinations;
- (L) output the computed result value to a second transformed dataset; and
- (M) repeat (E) to (L) with each remaining observation vector stored in the transformed dataset.

30. A method of creating interaction features from variable values in an input dataset, the method comprising:
creating, by a computing device, a transformed dataset that includes a variable value computed for each variable of a plurality of transformed variables, wherein the plurality of transformed variables are computed from a prior execution of a transformation flow applied to an input dataset;
- (A) receiving, by the computing device, an interaction transformation flow definition, wherein the interaction transformation flow definition indicates a subset of the plurality of transformed variables, a synthesis definition, and one or more interaction transformation operations to apply to the plurality of transformed variables, wherein the synthesis definition describes how the subset of the plurality of transformed variables are combined to compute a value input to the one or more interaction transformation operations;
- (B) defining, by the computing device, a plurality of variable combinations of the subset of the plurality of transformed variables based on the synthesis definition;
- (C) defining, by the computing device, a computation for each combination of the defined plurality of variable combinations and for each interaction transformation operation of the one or more interaction transformation operations;
- (D) computing, by the computing device, an operation data value for each defined computation from a plurality of observation vectors read from the transformed dataset, wherein each observation vector of the plurality of observation vectors includes a plurality of values, wherein each value of the plurality of values is associated with a different variable of the plurality of transformed variables;
- (E) reading, by the computing device, an observation vector from the transformed dataset to define a variable value for each variable of the plurality of transformed variables;
- (F) synthesizing, by the computing device, a current interaction variable value for each combination of the defined plurality of variable combinations using the defined variable value for each variable of the plurality of transformed variables included in a respective combination of the defined plurality of variable combinations;
- (G) selecting, by the computing device, a current interaction transformation operation from the one or more interaction transformation operations;
- (H) selecting, by the computing device, the computed operation data value for the selected current interaction transformation operation;
- (I) defining, by the computing device, a transformation function with the selected, computed operation data value based on the selected current interaction transformation operation;
- (J) computing, by the computing device, a result value for each combination of the defined plurality of variable combinations by executing the defined transformation function with the current interaction variable value defined for the respective combination of the defined plurality of variable combinations;
- (K) repeating, by the computing device, (H) to (J) with each remaining transformation operation of the one or more interaction transformation operations as the selected current interaction transformation operation and with the current interaction variable value equal to the computed result value for each combination of the defined plurality of variable combinations;
- (L) outputting, by the computing device, the computed result value to a second transformed dataset; and
- (M) repeating, by the computing device, (E) to (L) with each remaining observation vector stored in the transformed dataset.

* * * * *

UNITED STATES PATENT AND TRADEMARK OFFICE
CERTIFICATE OF CORRECTION

PATENT NO. : 11,281,689 B1
APPLICATION NO. : 17/504738
DATED : March 22, 2022
INVENTOR(S) : Biruk Gebremariam et al.

It is certified that error appears in the above-identified patent and that said Letters Patent is hereby corrected as shown below:

In the Specification

Column 14, Line 15:
Delete the phrase "mapinterval = {method="WOE"}" and replace with
--mapInterval = {method="WOE"}--.

Column 16, Line 6:
Delete the phrase "mapinterval" and replace with --mapInterval--.

Column 16, Line 21:
Delete the phrase "mapinterval" and replace with --mapInterval--.

Column 18, Line 12:
Delete the phrase "mapinterval" and replace with --mapInterval--.

Column 18, Line 58:
Delete the phrase "mapinterval" and replace with --mapInterval--.

Column 19, Line 13:
Delete the phrase "(mapinterval operation)," and replace with --(mapInterval operation),--.

Column 25, Line 41:
Delete the phrase "mapinterval" and replace with --mapInterval--.

Column 25, Line 44:
Delete the phrase "mapinterval" and replace with --mapInterval--.

Column 31, Line 22:
Delete the phrase "V, is computed" and replace with --$V_r$ is computed--.

Signed and Sealed this
Nineteenth Day of July, 2022

Katherine Kelly Vidal
*Director of the United States Patent and Trademark Office*

CERTIFICATE OF CORRECTION (continued)
U.S. Pat. No. 11,281,689 B1

In the Claims

Claim 7, Column 42, Line 45:

Delete the phrase "$\left(v_{1,i}, \ldots, v_{N_{tf}l}\right)$," and replace with --$\left(v_{1,i}, \ldots, v_{N_{tf},l}\right)$,--.